US012596818B2

(12) United States Patent
Tang et al.

(10) Patent No.: US 12,596,818 B2
(45) Date of Patent: Apr. 7, 2026

(54) PERMISSION MANAGEMENT METHOD AND TERMINAL DEVICE

(71) Applicant: Huawei Technologies Co., Ltd., Shenzhen (CN)

(72) Inventors: Faming Tang, Shanghai (CN); Chenkai Shen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 482 days.

(21) Appl. No.: 18/007,425

(22) PCT Filed: Jul. 23, 2021

(86) PCT No.: PCT/CN2021/108199
§ 371 (c)(1),
(2) Date: Jan. 30, 2023

(87) PCT Pub. No.: WO2022/022422
PCT Pub. Date: Feb. 3, 2022

(65) Prior Publication Data
US 2023/0297700 A1 Sep. 21, 2023

(30) Foreign Application Priority Data
Jul. 31, 2020 (CN) .......................... 202010765594.0

(51) Int. Cl.
*G06F 21/60* (2013.01)
*G06F 21/12* (2013.01)
*G06F 21/33* (2013.01)

(52) U.S. Cl.
CPC .......... *G06F 21/604* (2013.01); *G06F 21/121* (2013.01); *G06F 21/33* (2013.01)

(58) Field of Classification Search
CPC ...... G06F 21/604; G06F 21/121; G06F 21/33; G06F 21/51; G06F 21/53; G06F 21/6245;
(Continued)

(56) References Cited

U.S. PATENT DOCUMENTS 8,943,601 B1 * 1/2015 Zelov .................. G06F 21/6236
726/26
9,881,151 B2 * 1/2018 Chen ....................... G06F 21/54
(Continued)

FOREIGN PATENT DOCUMENTS

CN 103858130 A 6/2014
CN 105354489 A 2/2016
(Continued)

*Primary Examiner* — Han Yang
(74) *Attorney, Agent, or Firm* — Slater Matsil, LLP

(57) ABSTRACT
A method, device, and medium for permission management is disclosed. The method includes obtaining, based on it being detected that an application is being installed, one or more permissions that the application needs to apply for during running, setting, based on the one or more permissions comprising a special permission and based on an installation package of the application not comprising a special permission certificate, the special permission to an unavailable state, and continuing to install the application, where the special permission certificate records a special permission that the application is allowed to apply for during running.

18 Claims, 33 Drawing Sheets

(58) Field of Classification Search
CPC ...... G06F 21/629; G06F 21/6218; G06F 8/61;
G06F 9/44505; G06F 2221/2141
See application file for complete search history.

(56) References Cited

U.S. PATENT DOCUMENTS

| | | | | |
|---|---|---|---|---|
| 10,749,690 | B2 * | 8/2020 | Broumas ............... | H04L 9/0877 |
| 2013/0160147 | A1 * | 6/2013 | Draluk ................... | G06F 21/51 |
| | | | | 726/30 |
| 2015/0121478 | A1 * | 4/2015 | Huang ................. | G06F 21/604 |
| | | | | 726/4 |
| 2018/0248702 | A1 * | 8/2018 | Wu ...................... | H04L 9/3236 |

FOREIGN PATENT DOCUMENTS

| | | | |
|---|---|---|---|
| CN | 106557687 | A | 4/2017 |
| CN | 107169320 | A | 9/2017 |
| CN | 107615292 | A | 1/2018 |
| CN | 108932427 | A | 12/2018 |
| CN | 109711150 | A | 5/2019 |

* cited by examiner

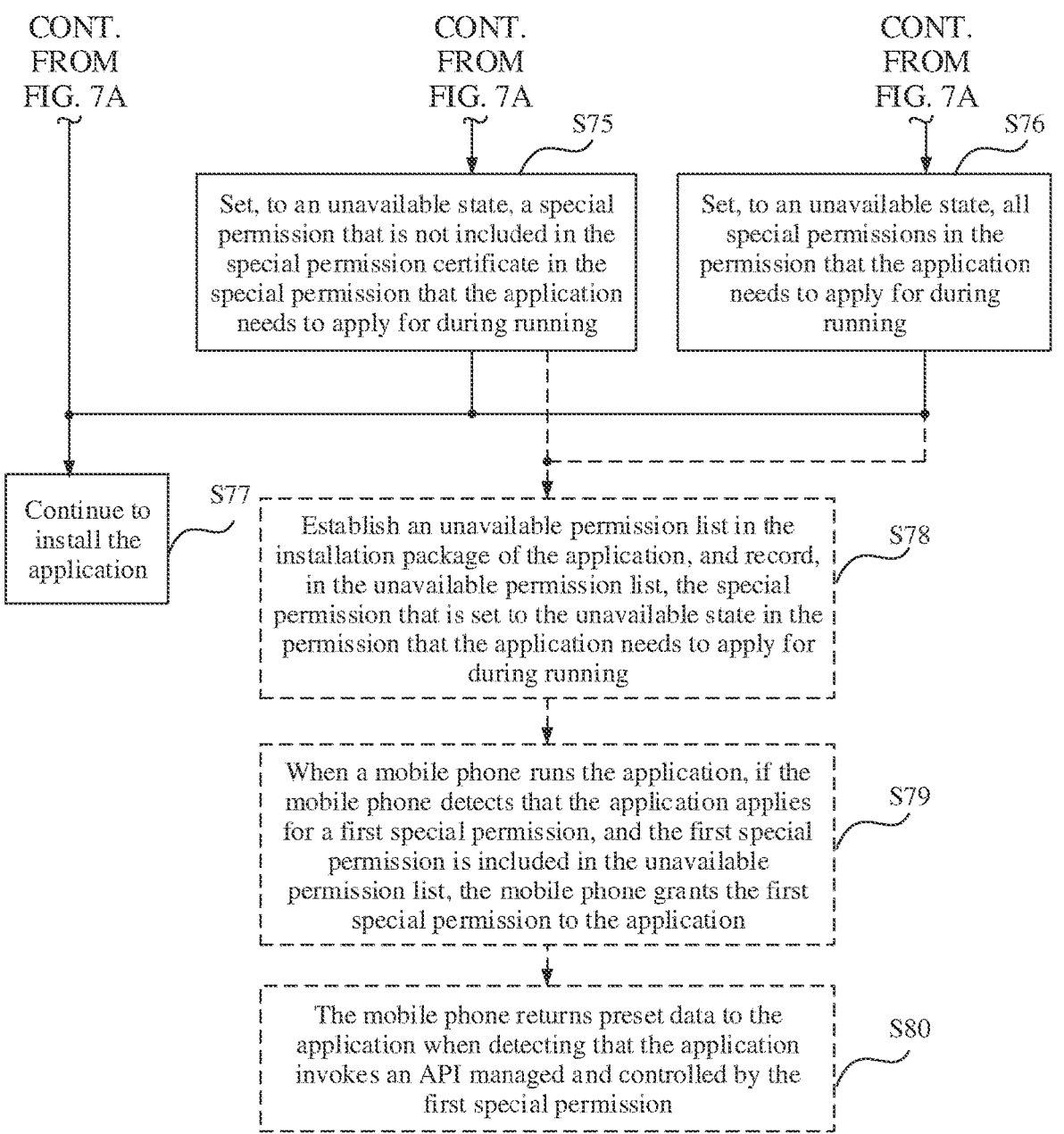

CONT.
FROM
FIG. 7A

CONT.
FROM
FIG. 7A                    S75

CONT.
FROM
FIG. 7A                    S76

Set, to an unavailable state, a special permission that is not included in the special permission certificate in the special permission that the application needs to apply for during running Set, to an unavailable state, all special permissions in the permission that the application needs to apply for during running Continue to install the application S77    Establish an unavailable permission list in the installation package of the application, and record, in the unavailable permission list, the special permission that is set to the unavailable state in the permission that the application needs to apply for during running    S78

When a mobile phone runs the application, if the mobile phone detects that the application applies for a first special permission, and the first special permission is included in the unavailable permission list, the mobile phone grants the first special permission to the application    S79

The mobile phone returns preset data to the application when detecting that the application invokes an API managed and controlled by the first special permission    S80

China Mobile ᴀ|ᴵ 🔋 07:13 xxxxx@huawei.com

Inbox >

Drafts >

Sent >

Deleted >

FIG. 13(b)

Figure 14A:
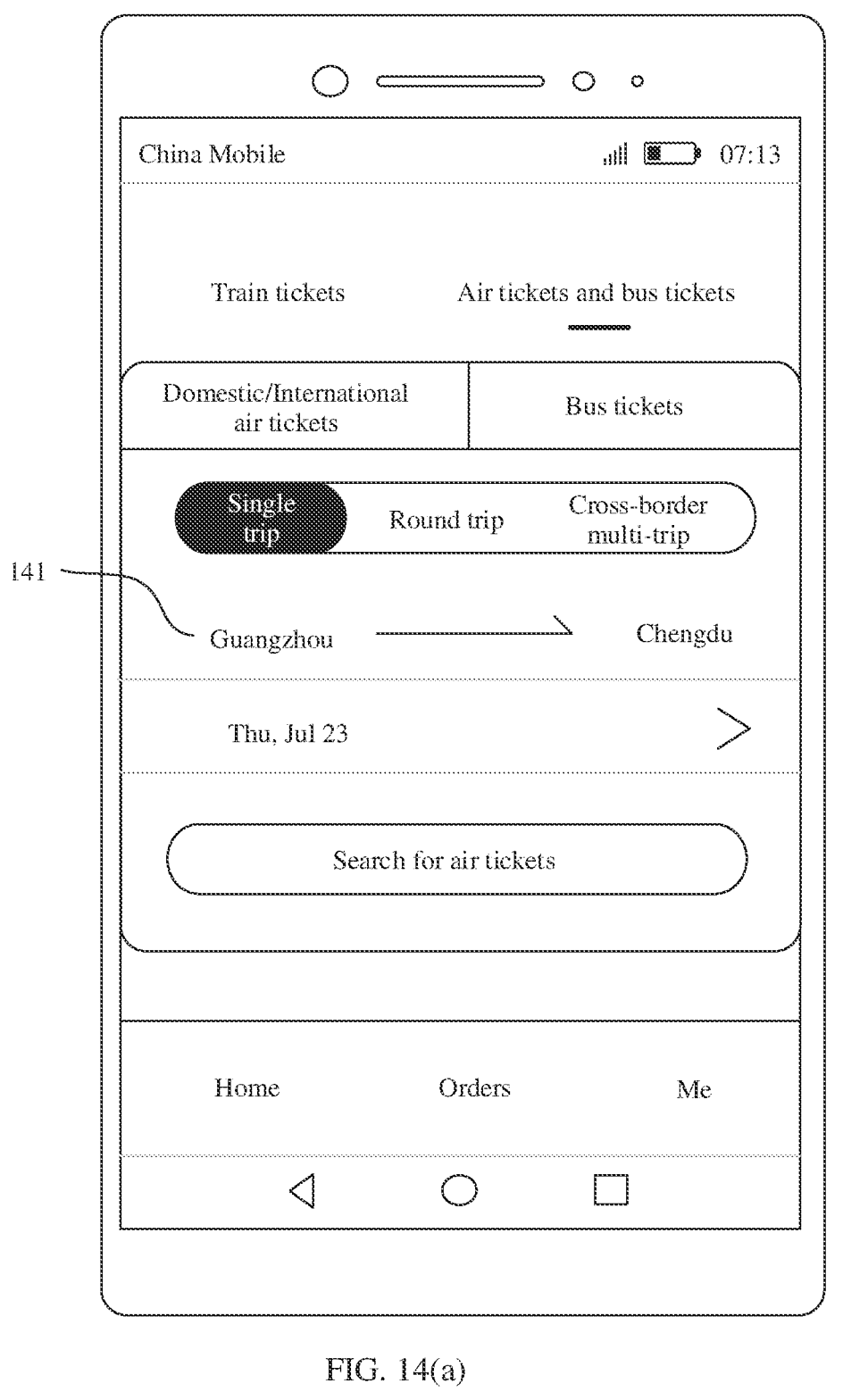

China Mobile          .ıll 🔋 07:13

Train tickets        Air tickets and bus tickets

| Domestic/International air tickets | Bus tickets |
| --- | --- |

Single trip     Round trip     Cross-border multi-trip

141

Guangzhou     ⟶     Chengdu

Thu, Jul 23          ＞

Search for air tickets

Home        Orders        Me

Figure 14B:
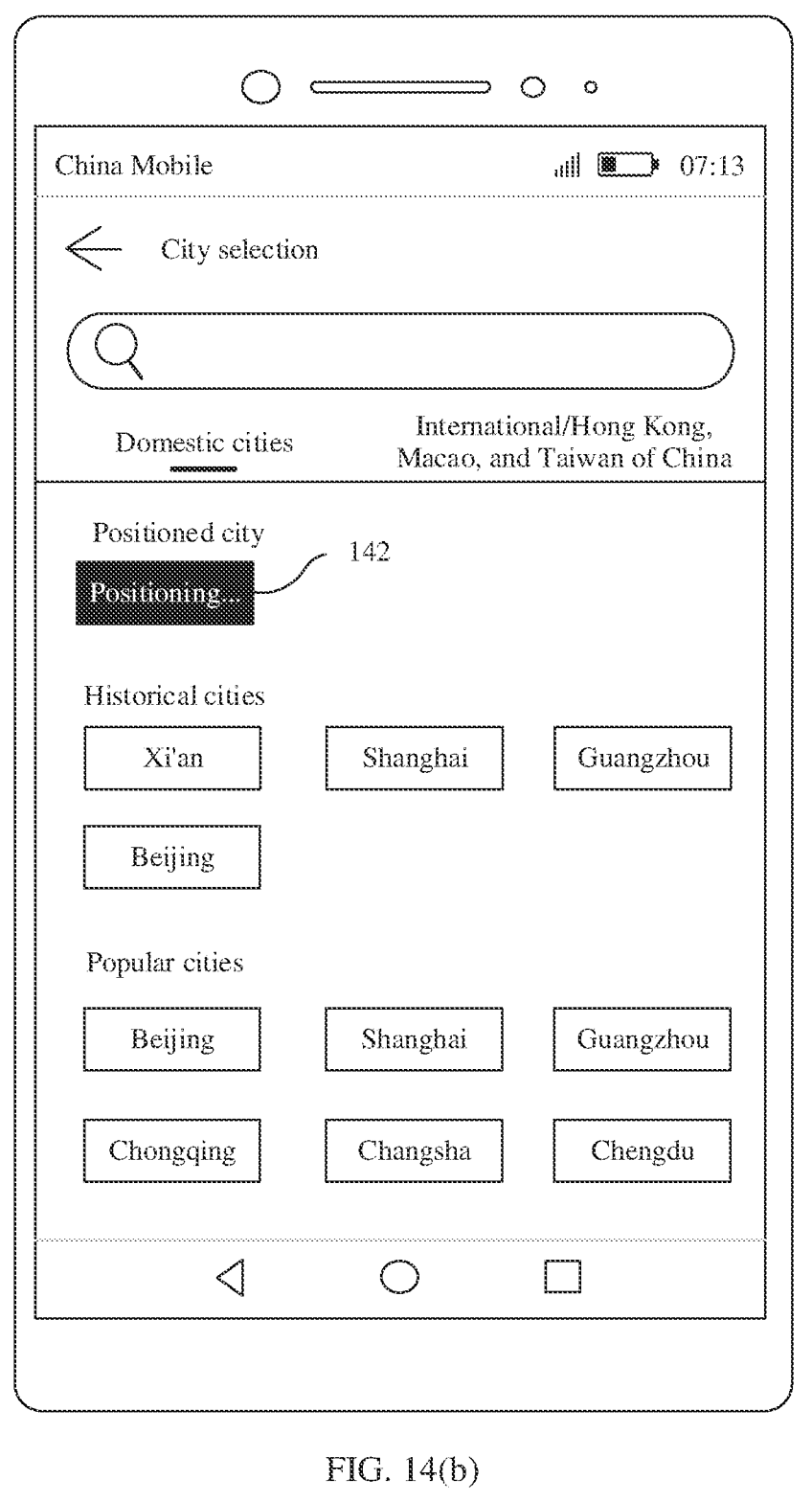

China Mobile       07:13

←    City selection

🔍

Domestic cities     International/Hong Kong, Macao, and Taiwan of China

Positioned city    142

Positioning...

Historical cities

| Xi'an | Shanghai | Guangzhou |
|-------|----------|-----------|

| Beijing |
|---------|

Popular cities

| Beijing | Shanghai | Guangzhou |
|---------|----------|-----------|

| Chongqing | Changsha | Chengdu |
|-----------|----------|---------|

China Mobile　　　　　　　　　　　　.ıll 🔋 07:13

← 　City selection

🔍

Domestic cities　　　　International/Hong Kong,
　　　　　　　　　　　Macao, and Taiwan of China Positioned city Shanghai　——— 142

Historical cities

| Xi'an | Shanghai | Guangzhou |

| Beijing |

Popular cities

| Beijing | Shanghai | Guangzhou |

| Chongqing | Changsha | Chengdu |

Figure 15C:
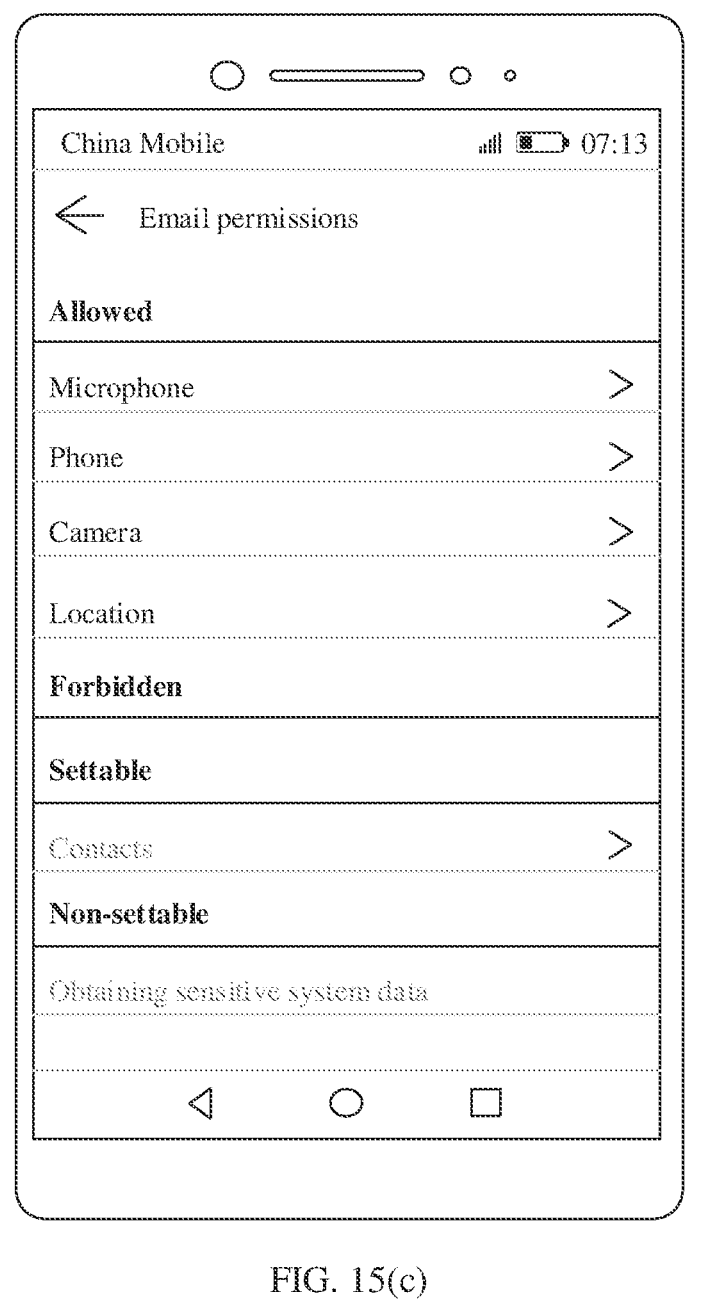

China Mobile                    ᵃⁱⁱⁱ ▆▆ 07:13

← Email permissions

Allowed

Microphone                          >

Phone                               >

Camera                              >

Forbidden

Settable

Contacts                            >

Non-settable

Obtaining sensitive system data

PERMISSION MANAGEMENT METHOD AND TERMINAL DEVICE

CROSS-REFERENCE TO RELATED APPLICATIONS

This application is a national stage of International Application No. PCT/CN2021/108199, filed on Jul. 23, 2021, which claims priority to Chinese Patent Application No. 202010765594.0, filed on Jul. 31, 2020. Both of the aforementioned applications are hereby incorporated by reference in their entireties.

TECHNICAL FIELD

Embodiments of this application relate to the field of terminal technologies, and in particular, to a permission management method and a terminal device.

BACKGROUND

With rapid development of science and technology, more functions can be implemented by an application (application, APP). Some functions can be implemented only when the APP has a corresponding permission. For example, a positioning function can be implemented only when the APP has a location permission. When an APP wants to have a permission of a terminal device to implement a corresponding function, a developer of the APP may declare the permission in a permission configuration file of the APP. In this way, the APP can apply to the terminal device or a user for the permission during running based on the permission declared in the permission configuration file. When the terminal device or the user grants the permission, the APP has the permission. In this way, the APP can invoke an application programming interface (application programming interface, API) managed and controlled by the permission, to implement the corresponding function.

In a current permission management mechanism, if a permission is required by at least one APP, a permission service organization opens the permission to all APPs, that is, the permission service organization allows any APP to apply for the permission during running. As a result, the permission is over-applied by the APP, and even is maliciously used by some APPs, security of a terminal system is low, and a risk of leaking privacy data of the user is high.

SUMMARY

In view of this, embodiments of this application provide a permission management method and a terminal device, to reduce a possibility that a special permission is abused by an application, improve security of a terminal system, and reduce a risk of leaking privacy data of a user.

To achieve the foregoing objectives, the following technical solutions are used in embodiments of this application.

According to a first aspect, an embodiment of this application provides a permission management method. The method may include:

when it is detected that an application is being installed, obtaining one or more permissions that the application needs to apply for during running; and if the one or more permissions include a special permission and an installation package of the application does not include a special permission certificate, setting the special permission to an unavailable state, and continuing to install the application, where the special permission certificate is used to record a special permission that the application is allowed to apply for during running.

The one or more permissions that the application needs to apply for during running may be recorded in a permission configuration file of the application, and the permission configuration file may be included in the installation package of the application.

The special permission may be a permission related to system security of a terminal device and/or privacy data of a user. By default, the special permission is not allowed to be applied for by any application during running. Only when a permission service organization grants the application an applying permission for a special permission, is the special permission allowed to be applied for by the application during running. The permission service organization may record, in the special permission certificate issued to the application, the special permission that the application is allowed to apply for during running.

According to the permission management method provided in this embodiment of this application, during installation of the application, if it is detected that the one or more permissions that the application needs to apply for during running include the special permission, but the installation package of the application does not include the special permission certificate, it indicates that the application is not granted an applying permission for any special permission by the permission service organization. Therefore, the special permission that the application needs to apply for during running is set to the unavailable state, so that the application cannot apply, during running, for the special permission that is set to the unavailable state. This can effectively reduce a possibility that the special permission is abused by the application. Because the application cannot apply, during running, for the special permission that is set to the unavailable state, the application cannot obtain, during running, data managed and controlled by the special permission. This can improve security of a terminal system, and reduce a risk of leaking the privacy data of the user.

In a possible implementation of the first aspect, after the obtaining one or more permissions that the application needs to apply for during running, the method further includes:

if the one or more permissions include the special permission, the installation package of the application includes the special permission certificate, and the special permission certificate is an invalid special permission certificate, setting the special permission included in the one or more permissions to the unavailable state, and continuing to install the application.

The invalid special permission certificate indicates that the special permission certificate is not issued by the permission service organization and/or a time point at which the application is installed is not within a validity period of the special permission certificate (that is, the special permission certificate expires when the application is installed).

In the foregoing implementation, when the installation package of the application includes the special permission certificate, but the special permission certificate is invalid, it indicates that the application is not granted the applying permission for any special permission by the permission service organization, or it indicates that the applying permission granted by the permission service organization to the application for the special permission expires. Therefore, the special permission that the application needs to apply for during running is set to the unavailable state, so that the application cannot apply, during running, for the special permission that is set to the unavailable state. This can effectively reduce the possibility that the special permission is abused by the application, improve security of the terminal system, and reduce the risk of leaking the privacy data of the user.

In another possible implementation of the first aspect, after the obtaining one or more permissions that the application needs to apply for during running, the method further includes:

if the one or more permissions include the special permission, the installation package of the application includes the special permission certificate, the special permission certificate is a valid special permission certificate, and at least one of the special permission included in the one or more permissions is not included in the special permission certificate, setting the special permission that is not included in the special permission certificate to the unavailable state, and continuing to install the application.

In the foregoing implementation, when the installation package of the application includes the special permission certificate, and the special permission certificate is valid, it indicates that the application is granted an applying permission for some special permissions by the permission service organization. A special permission included in the special permission certificate in the special permission that the application needs to apply for during running is the special permission that the application is allowed to apply for during running. A special permission not included in the special permission certificate in the special permission that the application needs to apply for during running is a special permission that the application is not allowed to apply for during running. Therefore, the special permission not included in the special permission certificate in the special permission that the application needs to apply for during running is set to the unavailable state, so that the application cannot apply, during running, for the special permission that is set to the unavailable state. This can effectively reduce the possibility that the special permission is abused by the application, improve security of the terminal system, and reduce the risk of leaking the privacy data of the user.

In still another possible implementation of the first aspect, after the obtaining one or more permissions that the application needs to apply for during running, the method further includes:

if the one or more permissions include the special permission, the installation package of the application includes the special permission certificate, the special permission certificate is a valid special permission certificate, and the special permission included in the one or more permissions is included in the special permission certificate, continuing to install the application.

In the foregoing implementation, when all special permissions that the application needs to apply for during running are included in the special permission certificate, it indicates that all the special permissions that the application needs to apply for during running are allowed to be applied for by the application during running. Therefore, the special permissions that the application needs to apply for during running may not be processed, so that the application can apply for the special permissions during running, to obtain system services corresponding to these special permissions. In this way, the application can implement more functions.

In still another possible implementation of the first aspect, after the obtaining one or more permissions that the application needs to apply for during running, the method further includes:

if the one or more permissions do not include the special permission, continuing to install the application.

In still another possible implementation of the first aspect, after the continuing to install the application, the method further includes:

when the application is run, if it is detected that a first permission that the application applies for is a permission that is not set to an unavailable state in the one or more permissions, and a type of the first permission is a permission that needs to be granted by a terminal device, granting the first permission to the application.

In still another possible implementation of the first aspect, after the continuing to install the application, the method further includes:

when the application is run, if it is detected that a first permission that the application applies for is a permission that is not set to an unavailable state in the one or more permissions, and a type of the first permission is a permission that needs to be granted by a user, displaying a grant request for the first permission, where the grant request is used to determine whether the user allows granting the first permission to the application, and for example, a prompt box may be displayed on a display interface of the application, and the grant request for the first permission is displayed in the prompt box; and granting the first permission to the application if an operation of indicating, by the user, to allow granting the first permission to the application is detected.

In still another possible implementation of the first aspect, after the displaying a grant request for the first permission, the method further includes:

if an operation of indicating, by the user, not to allow granting the first permission to the application is detected, skipping granting the first permission to the application.

In the foregoing implementation, the application is allowed, during running, to apply for only a special permission that is not set to an unavailable state in the permission configuration file of the application, and the application is not allowed, during running, to apply for a special permission that is set to an unavailable state in the permission configuration file of the application. Therefore, when running an application, the mobile phone displays a prompt box only for a permission that is not set to an unavailable state in a permission configuration file of the application and whose type is a permission that needs to be granted by the user. Compared with that an existing permission management method displays prompt boxes for all permissions, whose types are permissions that need to be granted by the user, in the permission configuration file of the application, this can reduce impact of display operations of the prompt boxes on a running process of the application.

In still another possible implementation of the first aspect, after the granting the first permission to the application, the method further includes:

if it is detected that the application invokes an application programming interface managed and controlled by the first permission, returning data managed and controlled by the first permission to the application.

In the foregoing implementation, because the data managed and controlled by the first permission is real data corresponding to a service managed and controlled by the first permission, the application can obtain the service managed and controlled by the first permission.

In still another possible implementation of the first aspect, after the setting the special permission to an unavailable state, and before the continuing to install the application, the method further includes:

establishing an unavailable permission list in the installation package of the application; and recording, in the unavailable permission list, the special permission that is set to the unavailable state in the special permission included in the one or more permissions.

In still another possible implementation of the first aspect, after the continuing to install the application, the method further includes:

when the application is run, if it is detected that a first special permission that the application applies for is included in the unavailable permission list, granting the first special permission to the application; and returning preset data to the application when it is detected that the application invokes an application programming interface managed and controlled by the first special permission, where the preset data includes empty data or false data, and the false data is data different from data managed and controlled by the first special permission.

In the foregoing implementation, for an application that is developed based on a conventional permission management mechanism and that has been launched, if the application cannot obtain, during running, data that is managed and controlled by a permission and that is recorded in a permission configuration file when the application is launched, an exception, for example, a crash, may occur. As a result, the application cannot run normally. Therefore, when the application is installed, a special permission that is set to an unavailable state in a special permission that the application needs to apply for during running may be recorded in an unavailable permission list. Based on this, when the first special permission that the application applies for during running is included in the foregoing unavailable permission list, it indicates that the first special permission is a special permission that is not allowed to be applied for by the application during running. However, to avoid the exception of the application, the first special permission may be first granted to the application, but when the application invokes the application programming interface managed and controlled by the first special permission, empty data or false data is returned to the application, so that the application cannot obtain real data managed and controlled by the first special permission. In this way, not only can the application run normally, but also security of the terminal system can be improved, and the risk of leaking the privacy data of the user can be reduced.

In still another possible implementation of the first aspect, after the returning preset data to the application, the method further includes:

displaying first prompt information on a display interface of the application, where the first prompt information is used to prompt the user that data that is related to the first special permission and that is obtained by the application is inaccurate.

In the foregoing implementation, after the empty data or the false data is returned to the application, the user is further prompted that the data that is related to the first special permission and that is obtained by the application is inaccurate. Therefore, user experience of using the application can be improved.

In still another possible implementation of the first aspect, after the returning preset data to the application, the method further includes:

if the first special permission is a permission related to the privacy data of the user, displaying second prompt information on a display interface of the application, where the second prompt information is used to determine whether the user allows returning the data managed and controlled by the first special permission to the application.

In the foregoing implementation, the user can determine whether to allow returning the data managed and controlled by the first special permission to the application. Therefore, not only can a risk of leaking the privacy data of the user be reduced, but also user experience of using the application can be improved. In addition, when the application invokes the application programming interface managed and controlled by the first special permission, the user can be prompted whether to allow returning the data managed and controlled by the first special permission to the application. Therefore, it is convenient for the user to perform instant management on the first special permission.

In still another possible implementation of the first aspect, after the displaying second prompt information on a display interface of the application, the method further includes:

if an operation of indicating, by the user, to allow returning the data managed and controlled by the first special permission to the application is detected, setting the first special permission to an available state, and removing the first special permission from the unavailable permission list.

In still another possible implementation of the first aspect, after the setting the first special permission to an available state, the method further includes:

if it is detected that the application invokes the application programming interface managed and controlled by the first special permission, returning the data managed and controlled by the first special permission to the application.

In the foregoing implementation, when the user allows returning the data managed and controlled by the first special permission to the application, when the application invokes the application programming interface managed and controlled by the first special permission, the data managed and controlled by the first special permission can be returned to the application, so that the application can obtain a system service managed and controlled by the first special permission, to enrich a function of the application.

In still another possible implementation of the first aspect, after the continuing to install the application, the method further includes:

displaying a permission setting interface of the application, where the permission that is not set to the unavailable state in the one or more permissions and a special permission included in the unavailable permission list of the application are displayed on the permission setting interface, a use status of the permission that is not set to the unavailable state is an available state, a use status of the special permission included in the unavailable permission list of the application is an unavailable state, in addition, a setting status of the permission that is not set to the unavailable state is a first state, a setting status of a special permission that is related to the privacy data of the user and that is included in the unavailable permission list of the application is the first state, a setting status of a special permission that is not related to the privacy data of the user and that is included in the unavailable permission list of the application is a second state, the first state is used to indicate that a use status of a permission can be set by the user, and the second state is used to indicate that a use status of a permission cannot be set by the user.

In the foregoing embodiment, the user can set a use status of one or more permissions of the application based on a requirement of the user, to improve user experience of using the application.

In still another possible implementation of the first aspect, when the application is installed in a test environment, after the obtaining one or more permissions that the application needs to apply for during running, the method further includes:

if the one or more permissions include the special permission, and the installation package of the application does not include the special permission certificate, stopping installing the application.

In still another possible implementation of the first aspect, when the application is installed in a test environment, after the obtaining one or more permissions that the application needs to apply for during running, the method further includes:

if the one or more permissions include the special permission, the installation package of the application includes the special permission certificate, and the special permission certificate is an invalid special permission certificate, stopping installing the application.

In still another possible implementation of the first aspect, when the application is installed in a test environment, after the obtaining one or more permissions that the application needs to apply for during running, the method further includes:

if the one or more permissions include the special permission, the installation package of the application includes the special permission certificate, the special permission certificate is a valid special permission certificate, and at least one of the special permission included in the one or more permissions is not included in the special permission certificate, stopping installing the application.

In still another possible implementation of the first aspect, after the stopping installing the application, the method further includes:

displaying third prompt information on a display interface of the application, where the third prompt information is used to prompt a cause of a failure in installing the application.

In the foregoing implementation, when the application is installed in the test environment, in the foregoing three cases, installation of the application can be stopped and/or the third prompt information can be output, to prompt the user that the applying permission that is of the application for the special permission needs to be applied to the permission service organization, so as to help a developer fix a vulnerability in the application.

According to a second aspect, an embodiment of this application provides a terminal device, including:

a first obtaining unit, configured to: when it is detected that an application is being installed, obtain one or more permissions that the application needs to apply for during running; and an installation control unit, configured to: if the one or more permissions include a special permission and an installation package of the application does not include a special permission certificate, set the special permission to an unavailable state, and continue to install the application, where the special permission certificate is used to record a special permission that the application is allowed to apply for during running.

In a possible implementation of the second aspect, the installation control unit is further configured to: if the one or more permissions include the special permission, the installation package of the application includes the special permission certificate, and the special permission certificate is an invalid special permission certificate, set the special permission included in the one or more permissions to the unavailable state, and continue to install the application.

In another possible implementation of the second aspect, the installation control unit is further configured to: if the one or more permissions include the special permission, the installation package of the application includes the special permission certificate, the special permission certificate is a valid special permission certificate, and at least one of the special permission included in the one or more permissions is not included in the special permission certificate, set the special permission that is not included in the special permission certificate to the unavailable state, and continue to install the application.

In still another possible implementation of the second aspect, the installation control unit is further configured to: if the one or more permissions include the special permission, the installation package of the application includes the special permission certificate, the special permission certificate is a valid special permission certificate, and the special permission included in the one or more permissions is included in the special permission certificate, continue to install the application.

In still another possible implementation of the second aspect, the installation control unit is further configured to: if the one or more permissions do not include the special permission, continue to install the application.

In still another possible implementation of the second aspect, the terminal device further includes:

a grant control unit, configured to: when the application is run, if it is detected that a first permission that the application applies for is a permission that is not set to an unavailable state in the one or more permissions, and a type of the first permission is a permission that needs to be granted by the terminal device, grant the first permission to the application.

In still another possible implementation of the second aspect, the terminal device further includes:

a display unit, configured to: when the application is run, if it is detected that a first permission that the application applies for is a permission that is not set to an unavailable state in the one or more permissions, and a type of the first permission is a permission that needs to be granted by a user, display a grant request for the first permission, where the grant request is used to determine whether the user allows granting the first permission to the application.

The grant control unit is further configured to grant the first permission to the application if an operation of indicating, by the user, to allow granting the first permission to the application is detected.

In still another possible implementation of the second aspect, the grant control unit is further configured to: if an operation of indicating, by the user, not to allow granting the first permission to the application is detected, skip granting the first permission to the application.

In still another possible implementation of the second aspect, the terminal device further includes:

a data processing unit, configured to: if it is detected that the application invokes an application programming interface managed and controlled by the first permission, return data managed and controlled by the first permission to the application.

In still another possible implementation of the second aspect, the terminal device further includes:

a list creation unit, configured to establish an unavailable permission list in the installation package of the application; and a list modification unit, configured to record, in the unavailable permission list, the special permission that is set to the unavailable state in the special permission included in the one or more permissions.

In still another possible implementation of the second aspect, the grant control unit is further configured to: when the application is run, if it is detected that a first special permission that the application applies for is included in the unavailable permission list, grant the first special permission to the application.

The data processing unit is further configured to return preset data to the application when it is detected that the application invokes an application programming interface managed and controlled by the first special permission. The preset data includes empty data or false data, and the false data is data different from data managed and controlled by the first special permission.

In still another possible implementation of the second aspect, the display unit is further configured to display first prompt information on a display interface of the application. The first prompt information is used to prompt the user that data that is related to the first special permission and that is obtained by the application is inaccurate.

In still another possible implementation of the second aspect, the display unit is further configured to: if the first special permission is a permission related to privacy data of a user, display second prompt information on a display interface of the application. The second prompt information is used to determine whether the user allows returning the data managed and controlled by the first special permission to the application.

In still another possible implementation of the second aspect, the terminal device further includes:

a permission management unit, configured to: if an operation of indicating, by the user, to allow returning the data managed and controlled by the first special permission to the application is detected, set the first special permission to an available state, and remove the first special permission from the unavailable permission list.

The data processing unit is further configured to: if it is detected that the application invokes the application programming interface managed and controlled by the first special permission, return the data managed and controlled by the first special permission to the application.

In still another possible implementation of the second aspect, the display unit is further configured to display a permission setting interface of the application. The permission that is not set to the unavailable state in the one or more permissions and a special permission included in the unavailable permission list of the application are displayed on the permission setting interface. A use status of the permission that is not set to the unavailable state is an available state, and a use status of the special permission included in the unavailable permission list of the application is an unavailable state. In addition, a setting status of the permission that is not set to the unavailable state is a first state. A setting status of a special permission that is related to the privacy data of the user and that is included in the unavailable permission list of the application is the first state. A setting status of a special permission that is not related to the privacy data of the user and that is included in the unavailable permission list of the application is a second state. The first state is used to indicate that a use status of a permission can be set by the user, and the second state is used to indicate that a use status of a permission cannot be set by the user.

In still another possible implementation of the second aspect, the installation control unit is further configured to: if the one or more permissions include the special permission, and the installation package of the application does not include the special permission certificate, stop installing the application.

In still another possible implementation of the second aspect, the installation control unit is further configured to: if the one or more permissions include the special permission, the installation package of the application includes the special permission certificate, and the special permission certificate is an invalid special permission certificate, stop installing the application.

In still another possible implementation of the second aspect, the installation control unit is further configured to: if the one or more permissions include the special permission, the installation package of the application includes the special permission certificate, the special permission certificate is a valid special permission certificate, and at least one of the special permission included in the one or more permissions is not included in the special permission certificate, stop installing the application.

In still another possible implementation of the second aspect, the display unit is further configured to display third prompt information on a display interface of the application. The third prompt information is used to prompt a cause of a failure in installing the application.

According to a third aspect, an embodiment of this application provides a terminal device, including at least one processor and at least one memory. The at least one memory stores computer instructions. When the computer instructions are executed by the at least one processor, the terminal device is enabled to perform the permission management method according to the first aspect.

According to a fourth aspect, an embodiment of this application provides a computer-readable storage medium, including computer instructions. When the computer instructions are run on a terminal device, the terminal device performs the permission management method according to the first aspect.

According to a fifth aspect, this application provides a computer program product. When the computer program product runs on a terminal device, the terminal device is enabled to perform the permission management method according to the first aspect and any one of the possible implementations of the first aspect.

According to a sixth aspect, this application provides a chip system. The chip system includes a memory and a processor. The processor executes a computer program stored in the memory, to implement the permission management method according to the first aspect and any one of the possible implementations of the first aspect.

According to a seventh aspect, this application provides another chip system. The chip system includes a processor, and the processor is coupled to a memory. The processor executes a computer program stored in the memory, to implement the permission management method according to the first aspect and any one of the possible implementations of the first aspect.

It may be understood that, for beneficial effects of the second aspect to the seventh aspect, refer to related descriptions in the first aspect. Details are not described herein again.

BRIEF DESCRIPTION OF THE DRAWINGS

FIG. 7A and FIG. 7B are a schematic flowchart of a permission management method according to an embodiment of this application;

FIG. 10 is a schematic diagram of still another interface according to an embodiment of this application;

FIG. 13(a) to FIG. 13(c) are a schematic diagram of still another group of interfaces according to an embodiment of this application;

FIG. 14(a) to FIG. 14(e) are a schematic diagram of still another group of interfaces according to an embodiment of this application;

FIG. 15(a) to FIG. 15(c) are a schematic diagram of still another group of interfaces according to an embodiment of this application.

DETAILED DESCRIPTION OF ILLUSTRATIVE EMBODIMENTS

Figure 1A:
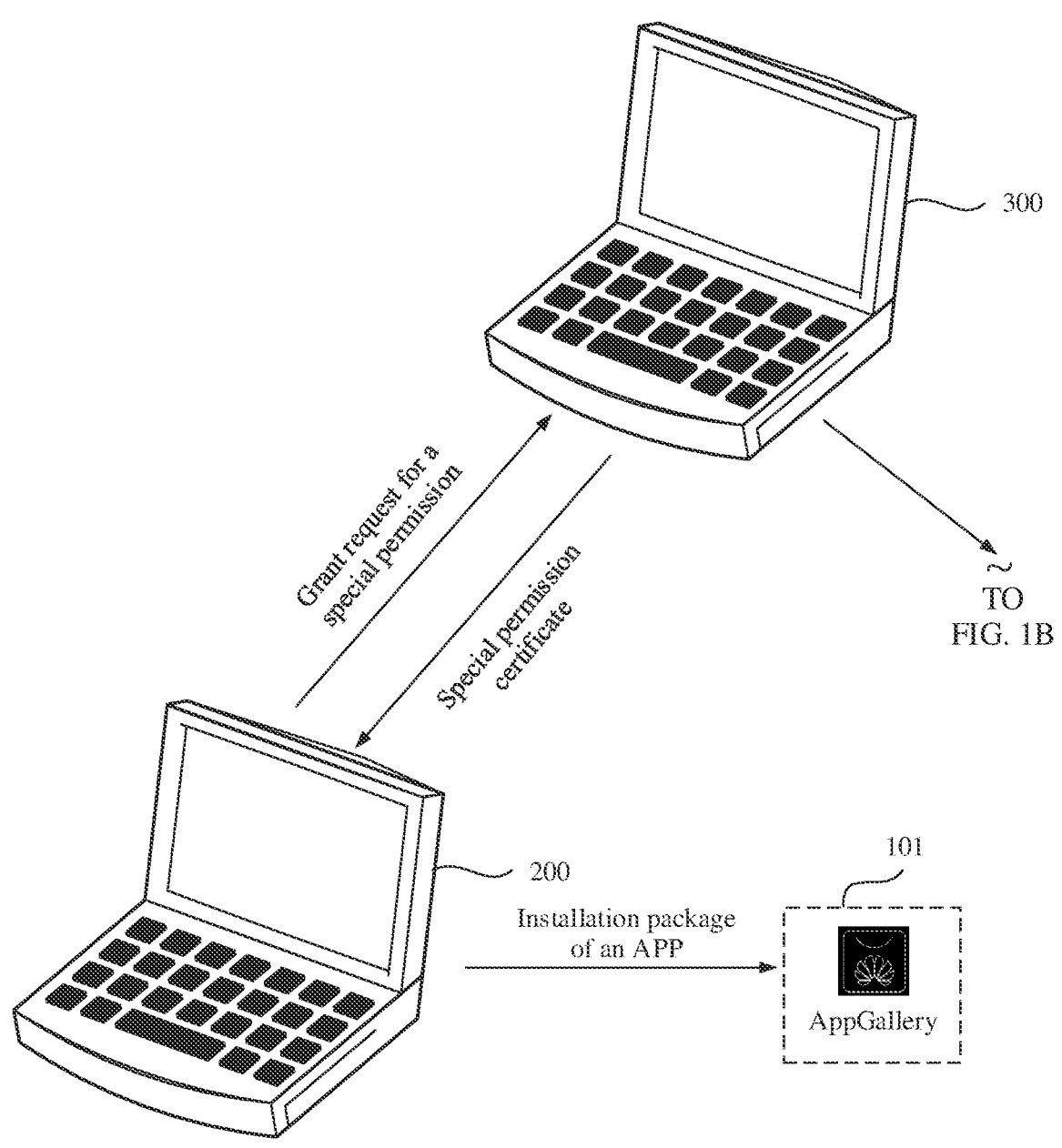
FIG. 1A and FIG. 1B are a schematic diagram of a structure of a system in a process in which an APP applies for a special permission according to an embodiment of this application.

The following describes the technical solutions in embodiments of this application with reference to the accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: A, B, and both A and B. In addition, in the descriptions in embodiments of this application, "a plurality of" means two or more, "include" indicates presence of described features, entireties, steps, operations, elements, and/or components, but does not exclude presence or addition of one or more other features, entireties, steps, operations, elements, components, and/or collections thereof, and "first", "second", "third", and the like are merely used for distinction and descriptions, but cannot be understood as indicating or implying relative importance.

Before embodiments of this application are described, related terms in embodiments of this application are first explained as follows:

1. A permission is used to obtain a system service corresponding to the permission.

The permission in embodiments of this application may include a location permission, an address book permission, an SMS message permission, a call permission, a call record permission, a camera permission, a microphone permission, a read/write permission for a storage card, a notification permission, a volume adjustment permission, and the like.

If an APP has a permission, the APP can obtain a system service corresponding to the permission. During specific application, when an APP has a permission, the APP may obtain, by invoking an API managed and controlled by the permission, a system service corresponding to the permission. For example, if an APP has the location permission, the APP may obtain a location service by invoking an API managed and controlled by the location permission.

In terms of permission levels of permissions, the permissions may be at least classified into a special permission and a normal permission.

The special permission may be a permission that is related to system security of a terminal device and/or privacy data of a user, and/or that is required by a few APPs to extend a user function. The "a few" may be determined based on an actual requirement. For example, the "a few" may be less than 5. The user function is a function that is actually required by the user, but is not a function that is considered by a developer of the APP to be required by the user.

The normal permission may be a permission that is not related to system security and the privacy data of the user.

For example, the special permission may include but is not limited to the location permission, the address book permission, the SMS message permission, the call permission, the call record permission, the camera permission, the microphone permission, and the read/write permission for the storage card. The normal permission may include but is not limited to the notification permission and the volume adjustment permission.

It should be noted that, in embodiments of this application, by default, the special permission is not allowed to be applied for by any APP during running. Only when a permission service organization grants an APP an applying permission for a special permission, is the special permission allowed to be applied for by the APP during running. The applying permission of the APP for the special permission is a permission of the APP to apply for the special permission during running. The normal permission is allowed to be applied for by any APP during running.

In embodiments of this application, to enable the terminal device to identify the special permission or the normal permission, a first permission list and/or a second permission list may be preconfigured for the terminal device. The first permission list is used to store identifiers of all special permissions, and the second permission list is used to store identifiers of all normal permissions. An identifier of the permission may be a name of the permission.

The terminal device may identify, based on the first permission list and/or the second permission list, whether a permission is a special permission or a normal permission. Specifically, if the terminal device detects that the first permission list includes an identifier of a permission, the terminal device determines that the permission is a special permission, or if the terminal device detects that the first permission list does not include an identifier of a permission, the terminal device determines that the permission is a normal permission. Alternatively, if the terminal device detects that the second permission list does not include an identifier of a permission, the terminal device determines that the permission is a special permission, or if the terminal device detects that the second permission list includes an identifier of a permission, the terminal device determines that the permission is a normal permission.

In terms of grant types of the permissions, the permissions may be at least classified into a permission that needs to be granted by the user and a permission that needs to be granted by the terminal device.

The permission that needs to be granted by the user is a permission that can be owned by the APP only after being granted by the user.

The permission that needs to be granted by the terminal device is a permission that can be owned by the APP only after being granted by the terminal device.

For example, the permission that needs to be granted by the user may be a permission related to the privacy data and/or a critical operation of the user. For example, the permission that needs to be granted by the user may include but is not limited to the location permission, the notification permission, the address book permission, the SMS message permission, the call permission, the call record permission, the camera permission, the microphone permission, the read/write permission for the storage card, and the notification permission. The permission that needs to be granted by the terminal device may be a permission that is not related to the privacy data and the critical operation of the user. For example, the permission that needs to be granted by the terminal device may include but is not limited to the volume adjustment permission.

If a type of a permission that the APP applies for during running is a permission that needs to be granted by the terminal device, the terminal device may directly grant the permission applied for by the APP. If a type of the permission that the APP applies for during running is a permission that needs to be granted by the user, the terminal device can grant, only with consent of the user, the permission applied for by the APP.

In embodiments of this application, to enable the terminal device to identify the permission that needs to be granted by the terminal device or the permission that needs to be granted by the user, a third permission list and/or a fourth permission list may be preconfigured for the terminal device. The third permission list is used to store identifiers of all permissions that need to be granted by the terminal device, and the fourth permission list is used to store identifiers of all permissions that need to be granted by the user.

The terminal device may identify, based on the third permission list and/or the fourth permission list, whether a permission is a permission that needs to be granted by the terminal device or a permission that needs to be granted by the user. Specifically, if the terminal device detects that the third permission list includes an identifier of a permission, the terminal device determines that the permission is a permission that needs to be granted by the terminal device, or if the terminal device detects that the third permission list does not include an identifier of a permission, the terminal device determines that the permission is a permission that needs to be granted by the user. Alternatively, if the terminal device detects that the fourth permission list does not include an identifier of a permission, the terminal device determines that the permission is a permission that needs to be granted by the terminal device, or if the terminal device detects that the fourth permission list includes an identifier of a permission, the terminal device determines that the permission is a permission that needs to be granted by the user.

2. A permission service organization is an organization that can provide an APP a grant service for an applying permission for a special permission.

By way of example and not limitation, the permission service organization may be an original equipment manufacturer (original equipment manufacturer, OEM), an APP ecosystem alliance, a system developer, or the like.

3. A special permission certificate is an electronic certificate that is issued by a permission service organization to an APP and that is used to record a special permission that the APP is allowed to apply for during running.

A format of the electronic certificate may be a preset format, and a name of the electronic certificate may carry a special permission certificate identifier. By way of example and not limitation, the preset format may be a portable document format (portable document format, PDF), a text (text, TXT) format, an extensible markup language (Extensible Markup Language, XML) format, or the like. The special permission certificate identifier may be a name of the special permission certificate.

4. A permission configuration file is a file used to record a permission that an APP needs to apply for during running.

By way of example and not limitation, the permission configuration file may be a file in a TXT format, or may be a file in an XML format, or may be a file in another format, or the like. For example, a software system to which the APP is applicable is an Android system. The permission configuration file may be an AndroidManifest.xml file.

It should be noted that there may be one or more permissions that the APP needs to apply for during running. A quantity of permissions that the APP needs to apply for during running is not particularly limited in this embodiment of this application.

In terms of a permission level of the permission, the one or more permissions each may be a normal permission or a special permission. In terms of a grant type of the permission, the one or more permissions each may be a permission that needs to be granted by the terminal device or a permission that needs to be granted by the user.

Figure 1B:
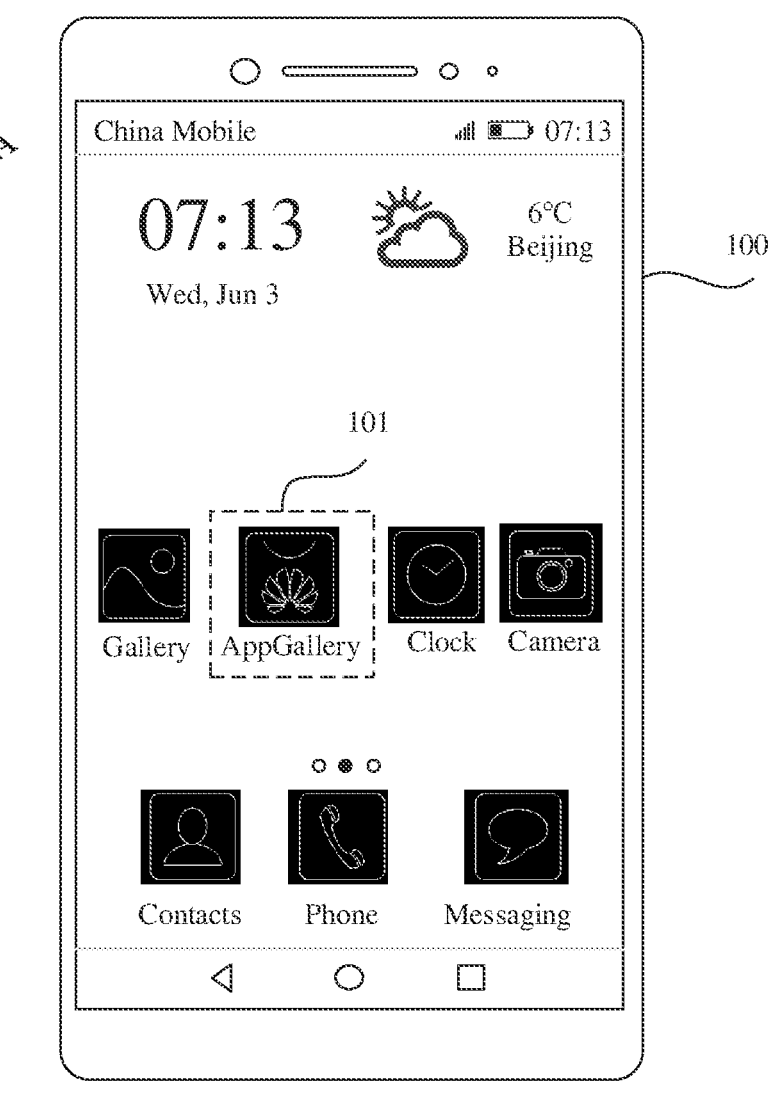

FIG. 1A and FIG. 1B are a schematic diagram of a structure of a system in a process in which an APP applies for a special permission according to an embodiment of this application. As shown in FIG. 1A and FIG. 1B, the system may include a first terminal 100, a second terminal 200, and a server 300. The first terminal 100 may be a terminal device used by any user, the second terminal 200 may be a terminal device used by a developer of the APP to develop the APP, and the server 300 may be a server of a permission service organization.

An AppGallery APP 101 may be installed on the first terminal 100, and the AppGallery APP 101 may be a service obtained by the first terminal 100 from the server 300. The AppGallery APP 101 may be used by the developer of the APP to launch an installation package of the APP developed by the developer, and may also be used by the first terminal 100 to obtain an installation package of an APP that the first terminal 100 needs to install.

In this embodiment of this application, the first terminal 100, the second terminal 200, and the server 300 each may be an electronic device, for example, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). In FIG. 1A and FIG. 1B, an example in which the first terminal 100 is a mobile phone, the second terminal 200 is a notebook computer, and the server 300 is a notebook computer is used for description.

By default, a special permission is not allowed to be applied for by any APP during running. Therefore, if an APP wants to apply for a special permission during running and obtain a system service corresponding to the special permission, when developing the APP, a developer of the APP may send a grant request for an applying permission for the special permission to the server 300 by using the second terminal 200 used by the developer of the APP, to request the permission service organization to grant the applying permission for the special permission to the APP.

The grant request needs to include at least the following information: an identifier of the APP that requests grant, an identity of the developer of the APP that requests grant, an identifier of the special permission requested by the APP that requests grant, and a description of necessity and appropriateness for the APP, that requests grant, to apply for the requested special permission during running. By way of example and not limitation, the identifier of the APP may be a name of the installation package of the APP, and the identity of the developer of the APP may be a self-signed public key that is related to the APP and that the developer of the APP has.

It should be noted that the self-signed public key that the developer of the APP requesting grant has may be signed by the server 300 in a special permission certificate for the APP. In this way, only a developer who has a private key corresponding to the self-signed public key can obtain content in the special permission certificate for the APP, to avoid that the special permission certificate for the APP is used by another developer.

In this embodiment of this application, when detecting an operation of indicating, by the developer, to generate the grant request, the second terminal 200 may generate the grant request for the applying permission for the special permission based on the identifier of the APP that requests grant, the identity of the developer of the APP that requests grant, the identifier of the special permission requested by the APP that requests grant, and the description of necessity and appropriateness for the APP, that requests grant, to apply for the requested special permission during running, which are input by the developer. The second terminal 200 may send the grant request to the server 300 when detecting an operation of indicating, by the developer, to send the grant request.

Figure 2:
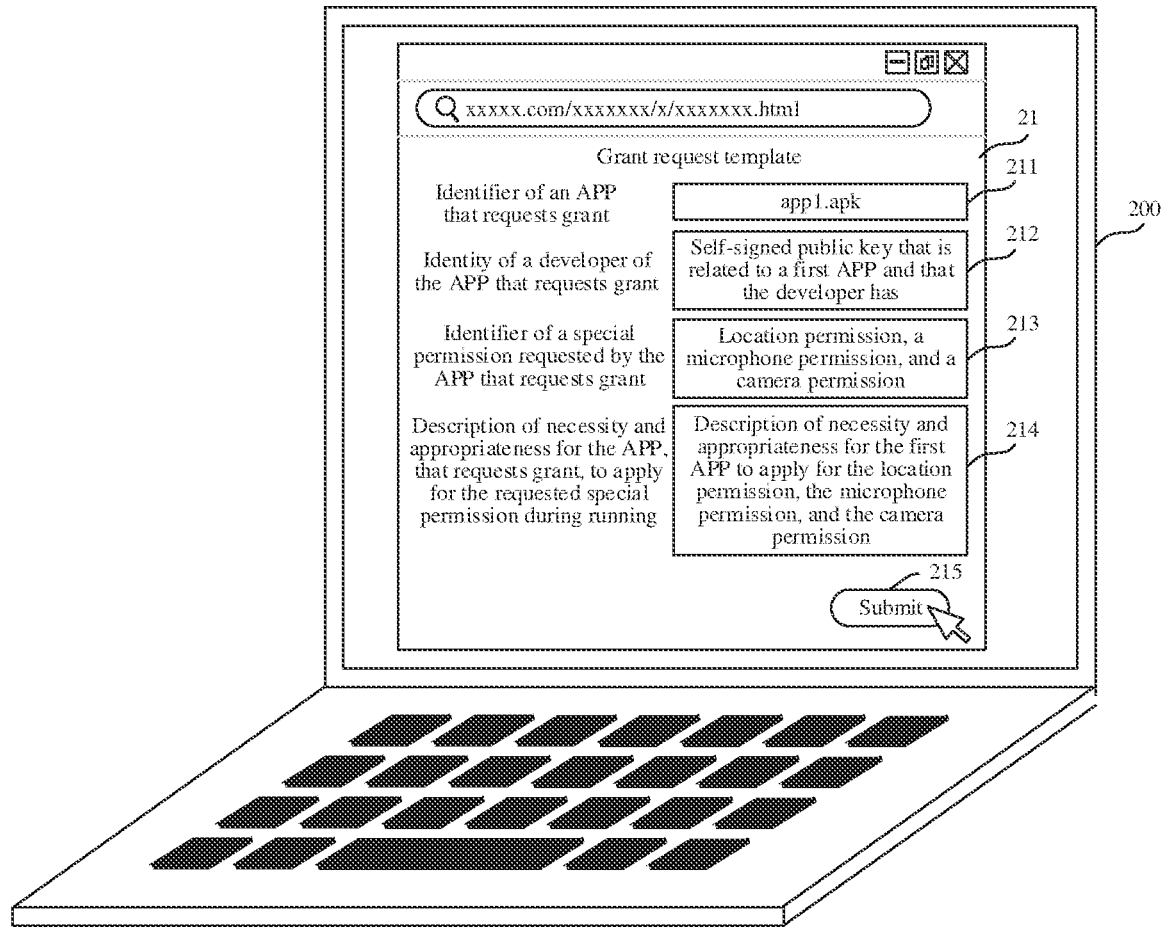
FIG. 2 is a schematic diagram of an interface according to an embodiment of this application.

For example, if a first APP wants to apply for the following three special permissions during running: a location permission, a microphone permission, and a camera permission, a developer of the first APP may respectively input, to a first input box 211, a second input box 212, a third input box 213, and a fourth input box 214 in an online grant request template 21 shown in FIG. 2, a name "app1.apk" of an installation package of the first APP, a self-signed public key that is related to the first APP and that the developer of the first APP has, the special permissions, namely, the location permission, the microphone permission, and the camera permission, that are requested by the first APP, and a description of necessity and appropriateness for the first APP to apply for the location permission, the microphone permission, and the camera permission. When detecting that the developer taps a "Submit" control 215 in the online grant request template 21, the second terminal 200 determines that the operation of indicating, by the developer, to generate the grant request and the operation of indicating, by the developer, to send the grant request are detected. The second terminal 200 generates the grant request based on the foregoing content respectively input by the developer to the first input box 211, the second input box 212, the third input box 213, and the fourth input box 214, and sends the grant request to the server 300. The online grant request template 21 may be provided by the permission service organization.

After receiving the grant request sent by the second terminal 200, the server 300 may display the identifier of the APP that requests grant, the identity of the developer of the APP that requests grant, the identifier of the special permission requested by the APP that requests grant, and the description of necessity and appropriateness for the APP, that requests grant, to apply for the requested special permission during running, which are included in the grant request.

A reviewer of the permission service organization may review, based on the description of necessity and appropriateness for the APP, that requests grant, to apply for the requested special permission during running, whether an operation of applying for the requested special permission by the APP, that requests grant, during actual running is appropriate and necessary.

In this embodiment of this application, if the reviewer determines that an operation of applying for some special permissions in the requested special permissions by the APP, that requests grant, during actual running is appropriate and necessary, the reviewer may mark these special permissions as special permissions that pass a review, and indicate the server 300 to generate the special permission certificate used to record the special permissions that pass the review. The special permission that passes the review is a special permission that the APP that requests grant is allowed to apply for during running.

For example, with reference to the previous example, if the reviewer determines that an operation of applying for the location permission by the first APP during running is appropriate and necessary, and an operation of applying for the microphone permission and the camera permission is inappropriate and/or unnecessary, the reviewer may mark the location permission as a special permission that passes the review, and indicate the server 300 to generate a special permission certificate used to record the location permission.

In an embodiment of this application, the special permission certificate may include at least the following information: an identifier of an APP that is allowed to apply for a special permission, an identity of a developer of the APP that is allowed to apply for the special permission, and an identifier of a special permission that is allowed to be applied for by the APP. The identifier of the APP that is allowed to apply for the special permission is the same as the identifier of the APP that requests grant and that is included in the grant request for the APP. The identity of the developer of the APP that is allowed to apply for the special permission is the same as the identity of the developer of the APP that requests grant and that is included in the grant request for the APP. The special permission that is allowed to be applied for by the APP is a special permission that passes the review in the special permission requested by the APP.

In this embodiment, when detecting an operation of indicating, by the reviewer, to generate the special permission certificate, the server 300 may generate the special permission certificate based on the identifier of the APP that is allowed to apply for the special permission, the identity of the developer of the APP that is allowed to apply for the special permission, and the identifier of the special permission that is allowed to be applied for by the APP, which are input by the reviewer.

Figure 3:
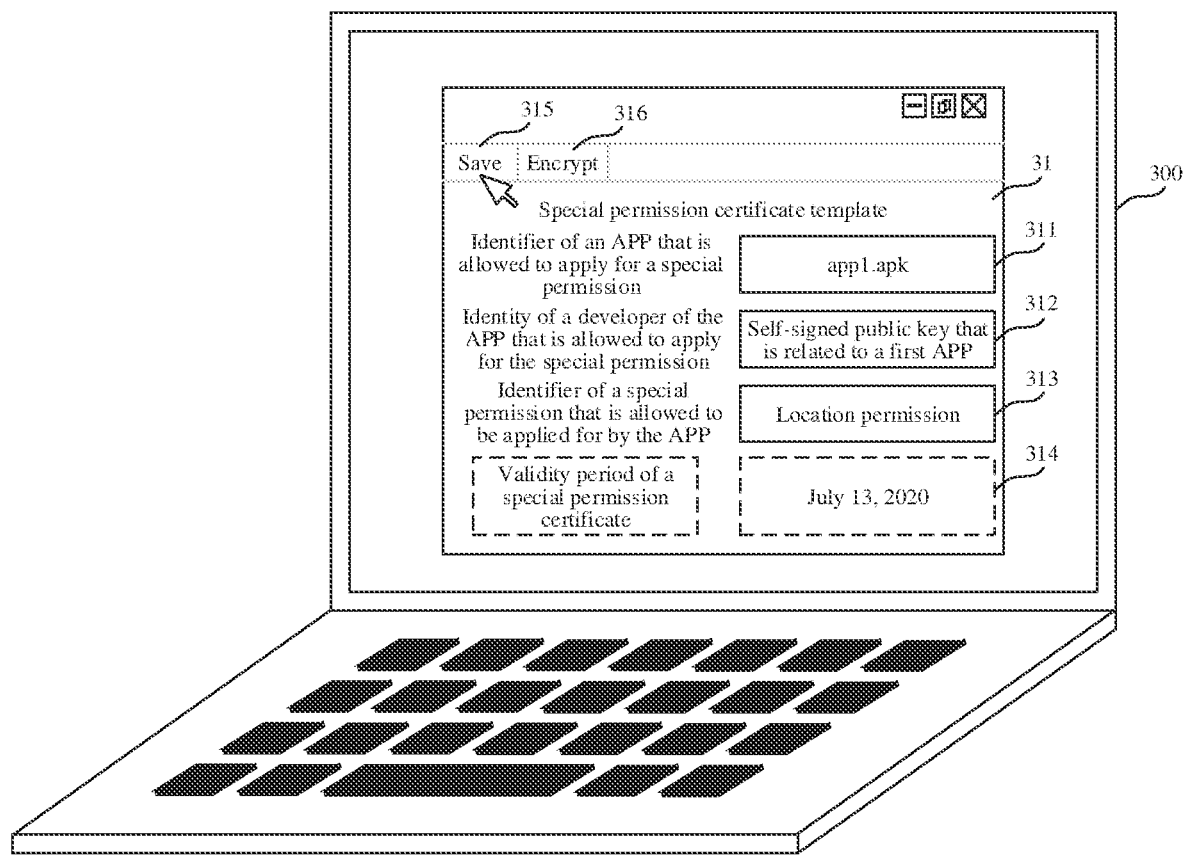
FIG. 3 is a schematic diagram of another interface according to an embodiment of this application.

For example, with reference to the previous example, if only the location permission in the special permissions requested by the first APP is the special permission that passes the review, the reviewer may respectively input, to a first input box 311, a second input box 312, and a third input box 313 in a special permission certificate template 31 shown in FIG. 3, the name "app1.apk" of the installation package of the first APP, the self-signed public key related to the first APP, and an identifier, namely, the location permission, of a special permission that is allowed to be applied for by the first APP. When detecting that the reviewer taps a "Save" control 315 in the special permission certificate template 31, the server 300 determines that the operation of indicating, by the reviewer, to generate the special permission certificate is detected. The server 300 generates a special permission certificate for the first APP based on the input content in the first input box 311, the second input box 312, and the third input box 313.

In another embodiment of this application, the special permission certificate may further include a validity period of the special permission certificate. The validity period of the special permission certificate may be an expiration date of the special permission certificate, and may be determined by the reviewer based on an actual situation. For example, if the validity period of the special permission certificate is Jul. 13, 2020, it may be considered that the expiration date of the special permission certificate is Jul. 13, 2020, that is, the special permission certificate expires on Jul. 14, 2020.

In this embodiment, when detecting the operation of indicating, by the reviewer, to generate the special permission certificate, the server 300 may generate the special permission certificate based on the identifier of the APP that is allowed to apply for the special permission, the identity of the developer of the APP that is allowed to apply for the special permission, the identifier of the special permission that is allowed to be applied for by the APP, and the validity period of the special permission certificate, which are input by the reviewer.

For example, if only the location permission in the special permissions requested by the first APP is the special permission that passes the review, the reviewer may respectively input, to the first input box 311, the second input box 312, the third input box 313, and a fourth input box 314 in the special permission certificate template 31 shown in FIG. 3, the name "app1.apk" of the installation package of the first APP, the self-signed public key related to the first APP, the identifier, namely, the location permission, of the special permission that is allowed to be applied for by the first APP, and the validity period "Jul. 13, 2020" of the special permission certificate. When detecting that the reviewer taps the "Save" control 315 in the special permission certificate template 31, the server 300 determines that the operation of indicating, by the reviewer, to generate the special permission certificate is detected. The server 300 generates the special permission certificate for the first APP based on the input content in the first input box 311, the second input box 312, the third input box 313, and the fourth input box 314.

It should be noted that, when the special permission certificate does not include the validity period of the special permission certificate, it may be considered that the special permission certificate is permanently effective, or when the special permission certificate includes the validity period of the special permission certificate, it may be considered that the special permission certificate is effective only within the validity period of the special permission certificate.

In still another embodiment of this application, to prevent the special permission certificate from being forged or maliciously tampered with, the server 300 may perform digital signature on the special permission certificate by using a private key of the permission service organization when detecting an operation of indicating, by the reviewer, to perform digital signature on the special permission certificate. When detecting an operation of indicating, by the reviewer, to send the special permission certificate, the server 300 sends, to the second terminal 200, a special permission certificate obtained after digital signature is performed.

Figure 4:
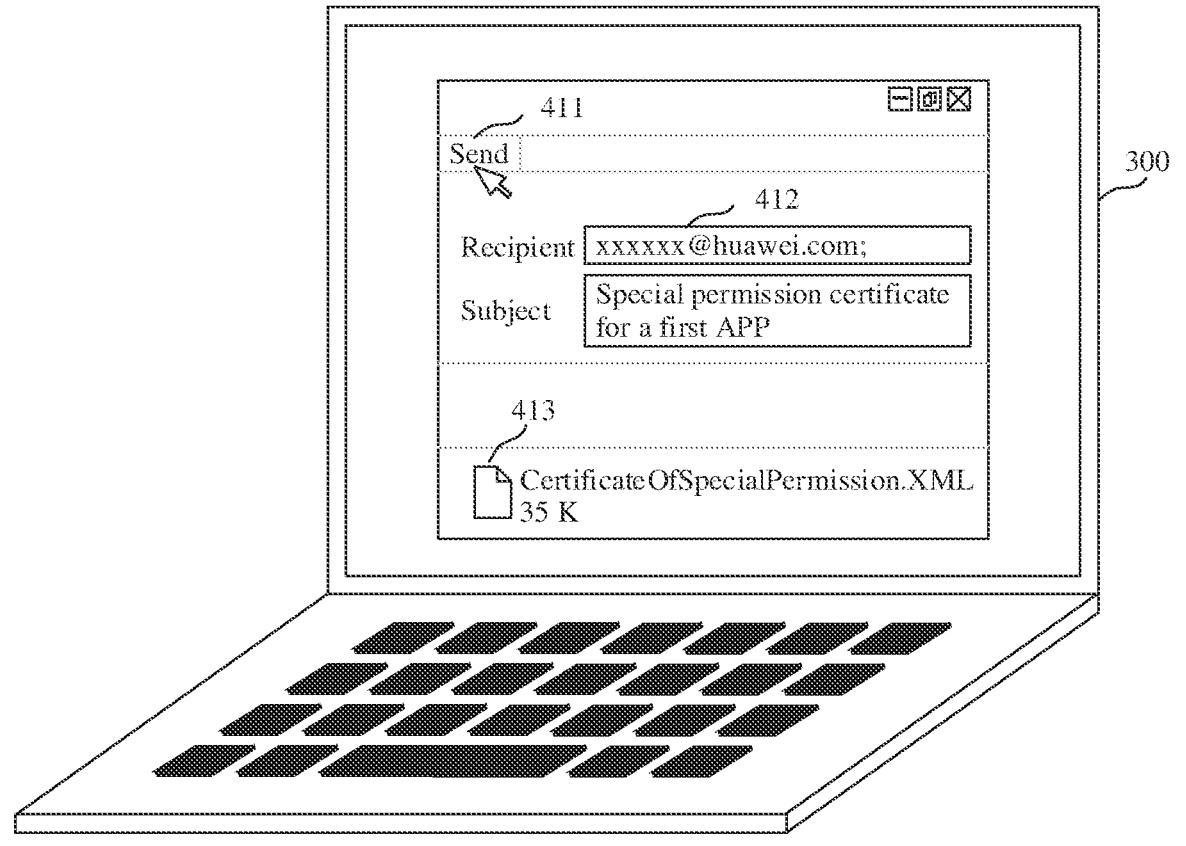
FIG. 4 is a schematic diagram of still another interface according to an embodiment of this application.

For example, when detecting that the reviewer taps an "Encrypt" control 316 in the special permission certificate template 31 shown in FIG. 3, the server 300 determines that the operation of indicating, by the reviewer, to perform digital signature on the special permission certificate is detected. The server 300 performs digital signature on the special permission certificate by using the private key of the permission service organization. When detecting that the reviewer taps a "Send" control 411 on an email sending interface shown in FIG. 4, the server 300 determines that the operation of indicating, by the reviewer, to send the special permission certificate is detected. The server 300 sends, to the second terminal that logs in to a mailbox 412 of the developer of the first APP, an email whose attachment is the special permission certificate 413 for the first APP. The mailbox of the developer of the APP may be provided by the second terminal to the server 300 when the second terminal sends the grant request.

In this embodiment of this application, after obtaining the special permission certificate corresponding to the APP that requests grant, the developer of the APP may configure the special permission certificate in the installation package of the APP that requests grant, and then launch the installation package to the AppGallery APP for the user to download.

With reference to the foregoing embodiment and corresponding accompanying drawings, embodiments of this application provide a permission management method. The method may be applied to the first terminal 100 in FIG. 1A and FIG. 1B. In embodiments of this application, the permission management method is described in detail by using an example in which the first terminal 100 is a mobile phone.

Figure 5:
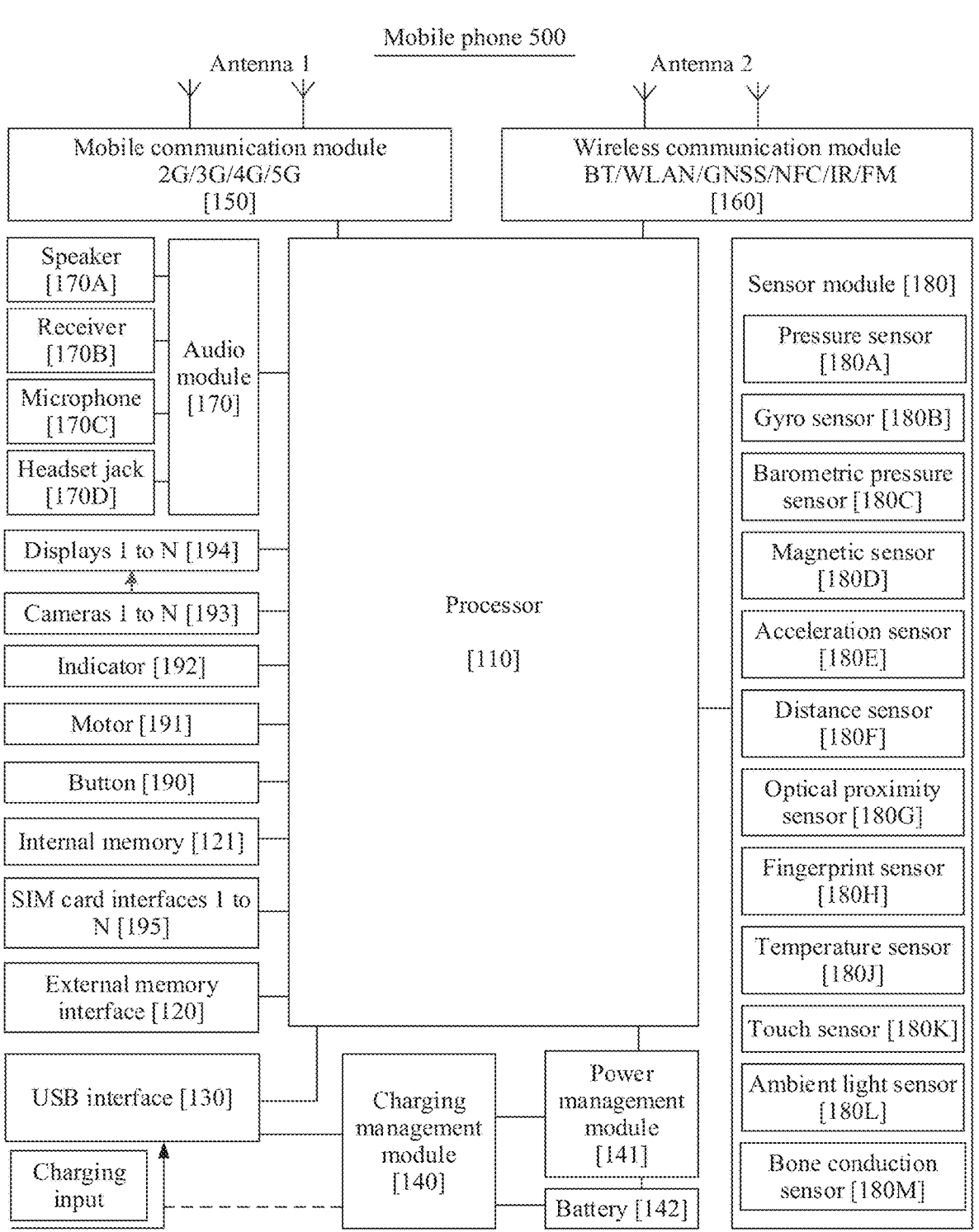
FIG. 5 is a schematic diagram of a hardware structure of a terminal device according to an embodiment of this application.

For example, FIG. 5 is a schematic diagram of a hardware structure of a mobile phone according to an embodiment of this application. As shown in FIG. 5, the mobile phone 500 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the mobile phone 500. In some other embodiments of this application, the mobile phone 500 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the mobile phone 500. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 500.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may be also configured to perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some other embodiments, the audio module 170 may transmit an audio signal to the wireless communication module 160 through the UART interface, to implement a function of playing music through a Bluetooth headset.

The MIPI interface may be configured to connect the processor 110 to a peripheral component, for example, the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the mobile phone 500. The processor 110 communicates with the display 194 through the DSI interface, to implement a display function of the mobile phone 500.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may be alternatively configured as an I2C interface, an I2S interface, a UART interface, a MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the mobile phone 500, or may be configured to perform data transmission between the mobile phone 500 and a peripheral device. The USB interface 130 may be alternatively configured to connect to a headset, to play audio through the headset. The interface may be alternatively configured to connect to another mobile phone, for example, an AR device.

It may be understood that an interface connection relationship between the modules shown in this embodiment of this application is merely an example for description, and constitutes no limitation on the structure of the mobile phone 500. In some other embodiments of this application, the mobile phone 500 may alternatively use an interface connection manner different from that in the foregoing embodiment, or a combination of a plurality of interface connection manners.

The charging management module 140 is configured to receive a charging input from a charger. The charger may be a wireless or wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the mobile phone 500. When charging the battery 142, the charging management module 140 may further supply power to the mobile phone by using the power management module 141.

The power management module 141 is configured to connect the battery 142 and the charging management module 140 to the processor 110. The power management module 141 receives an input from the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may be alternatively disposed in a same component.

A wireless communication function of the mobile phone 500 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 500 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that includes wireless communication such as 2G, 3G, 4G, and 5G and that is applied to the mobile phone 500. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some other embodiments, at least some function modules of the mobile communication module 150 may be disposed in the processor 110. In some embodiments, at least some function modules of the mobile communication module 150 may be disposed in a same component as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same component as the mobile communication module 150 or another function module.

The wireless communication module 160 may provide a solution that is applied to the mobile phone 500 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the mobile phone 500, the antenna 1 and the mobile communication module 150 are coupled, and the antenna 2 and the wireless communication module 160 are coupled, so that the mobile phone 500 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile phone 500 implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light-emitting diodes (quantum dot light emitting diodes, QLEDs), or the like. In some embodiments, the mobile phone 500 may include one or N displays 194, where N is a positive integer greater than 1.

The mobile phone 500 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a light-sensitive element of the camera through a lens. An optical signal is converted into an electrical signal, and the light-sensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The light-sensitive element may be a charge-coupled device (charge-coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the mobile phone 500 may include one or N cameras 193, where N is a positive integer greater than 1.

The digital signal processor is configured to process a digital signal, and may process another digital signal in addition to the digital image signal. For example, when the mobile phone 500 selects a frequency, the digital signal processor is configured to perform Fourier transformation and the like on frequency energy.

The video codec is configured to compress or decompress a digital video. The mobile phone 500 may support one or more video codecs. In this way, the mobile phone 500 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the mobile phone 500, for example, image recognition, facial recognition, speech recognition, and text understanding, may be implemented by using the NPU.

The external memory interface 120 may be configured to connect to an external storage card, for example, a micro SD card, to extend a storage capability of the mobile phone 500. The external storage card communicates with the processor 110 through the external memory interface 120, to implement a data storage function. For example, files such as music and videos are stored in the external storage card.

The internal memory 121 may be configured to store computer-executable program code, and the executable program code includes instructions. The internal memory 121 may include a program storage area and a data storage area. The program storage area may store an operating system, an application required by at least one function (for example, a voice playing function or an image playing function), and the like. The data storage area may store data (for example, audio data or a phone book) created during use of the mobile phone 500, and the like. In addition, the internal memory 121 may include a high-speed random access memory, and may further include a non-volatile memory, for example, at least one magnetic disk storage component, a flash memory, or a universal flash storage (universal flash storage, UFS). The processor 110 runs the instructions stored in the internal memory 121 and/or the instructions stored in the memory disposed in the processor, to execute various function applications of the mobile phone 500 and data processing.

The mobile phone 500 may implement an audio function, for example, music playing or recording by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The mobile phone 500 may be used to listen to music or answer a call in a hands-free mode over the speaker 170A.

The receiver 170B, also referred to as an "earpiece", is configured to convert an electrical audio signal into a sound signal. When a call is answered or a voice message is received by using the mobile phone 500, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the mobile phone 500. In some other embodiments, two microphones 170C may be disposed in the mobile phone 500, to collect a sound signal and further implement a noise reduction function. In some other embodiments, three, four, or more microphones 170C may be alternatively disposed in the mobile phone 500, to collect a sound signal, implement noise reduction, and identify a sound source, so as to implement a directional recording function and the like.

The headset jack 170D is configured to connect to a wired headset. The headset jack 170D may be a USB interface 130, a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The mobile phone 500 determines pressure strength based on a capacitance change. When a touch operation is performed on the display 194, the mobile phone 500 detects intensity of the touch operation by using the pressure sensor 180A. The mobile phone 500 may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a motion posture of the mobile phone 500. In some embodiments, angular velocities of the mobile phone 500 around three axes (namely, x, y, and z axes) may be determined by using the gyro sensor 180B. The gyro sensor 180B may be configured to implement image stabilization during photographing. For example, when the shutter is pressed, the gyro sensor 180B detects an angle at which the mobile phone 500 jitters, calculates, based on the angle, a distance for which a lens module needs to compensate, and allows the lens to cancel the jitter of the mobile phone 500 through reverse motion, to implement image stabilization. The gyro sensor 180B may be further used in a navigation scenario and a somatic game scenario.

The barometric pressure sensor 180C is configured to measure barometric pressure. In some embodiments, the mobile phone 500 calculates an altitude based on a barometric pressure value measured by the barometric pressure sensor 180C, to assist in positioning and navigation.

The magnetic sensor 180D includes a Hall sensor. The mobile phone 500 may detect opening and closing of a flip cover by using the magnetic sensor 180D. In some embodiments, when the mobile phone 500 is a flip phone, the mobile phone 500 may detect opening and closing of a flip cover by using the magnetic sensor 180D. Further, a feature, for example, automatic unlocking upon opening of the flip cover is set based on a detected opening or closing state of the flip cover.

The acceleration sensor 180E may detect magnitude of accelerations in various directions (generally on three axes) of the mobile phone 500. Magnitude and a direction of gravity may be detected when the mobile phone 500 is still. The acceleration sensor 180E may be further configured to identify a posture of the mobile phone, and is applied to an application such as switching between a landscape mode and a portrait mode or a pedometer.

The distance sensor 180F is configured to measure a distance. The mobile phone 500 may measure a distance in an infrared or a laser manner. In some embodiments, in a photographing scenario, the mobile phone 500 may measure a distance by using the range sensor 180F, to implement quick focusing.

The optical proximity sensor 180G may include, for example, a light-emitting diode (LED) and an optical detector, for example, a photodiode. The light-emitting diode may be an infrared light-emitting diode. The mobile phone 500 emits infrared light by using the light-emitting diode. The mobile phone 500 detects infrared reflected light from a nearby object by using the photodiode. When sufficient reflected light is detected, it may be determined that there is an object near the mobile phone 500. When insufficient reflected light is detected, the mobile phone 500 may determine that there is no object near the mobile phone 500. The mobile phone 500 may detect, by using the optical proximity sensor 180G, that the user holds the mobile phone 500 close to an ear to make a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The mobile phone 500 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the mobile phone 500 is in a pocket, to avoid an accidental touch.

The fingerprint sensor 180H is configured to collect a fingerprint. The mobile phone 500 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile phone 500 executes a temperature processing policy based on the temperature detected by the temperature sensor 180J. For example, when the temperature reported by the temperature sensor 180J, exceeds a threshold, the mobile phone 500 lowers performance of a processor near the temperature sensor 180J, to reduce power consumption for thermal protection. In some other embodiments, when the temperature is less than another threshold, the mobile phone 500 heats the battery 142 to prevent the mobile phone 500 from being shut down abnormally due to a low temperature. In some other embodiments, when the temperature is less than still another threshold, the mobile phone 500 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K.

The touch sensor may transfer the detected touch operation to the application processor to determine a type of a touch event. A visual output related to the touch operation may be provided through the display 194. In some other embodiments, the touch sensor 180K may be alternatively disposed on a surface of the mobile phone 500 and is at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some other embodiments, the bone conduction sensor 180M may also be disposed in a headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or a touch button. The mobile phone 500 may receive a button input, and generate a button signal input related to a user setting and function control of the mobile phone 500.

The motor 191 may generate a vibration prompt. The motor 191 may be used for an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the mobile phone 500. The mobile phone 500 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may be also compatible with an external storage card. The mobile phone 500 interacts with a network by using the SIM card, to implement functions such as calling and data communication. In some embodiments, the mobile phone 500 uses an eSIM, namely, an embedded SIM card. The eSIM card may be embedded in the mobile phone 500, and cannot be separated from the mobile phone 500.

A software system of the mobile phone 500 may use a layered architecture, an event-driven architecture, a micro-kernel architecture, a micro service architecture, or a cloud architecture. In an embodiment of this application, an Android (Android) system with a layered architecture is used as an example to describe a software structure of the mobile phone 500.

Figure 6:
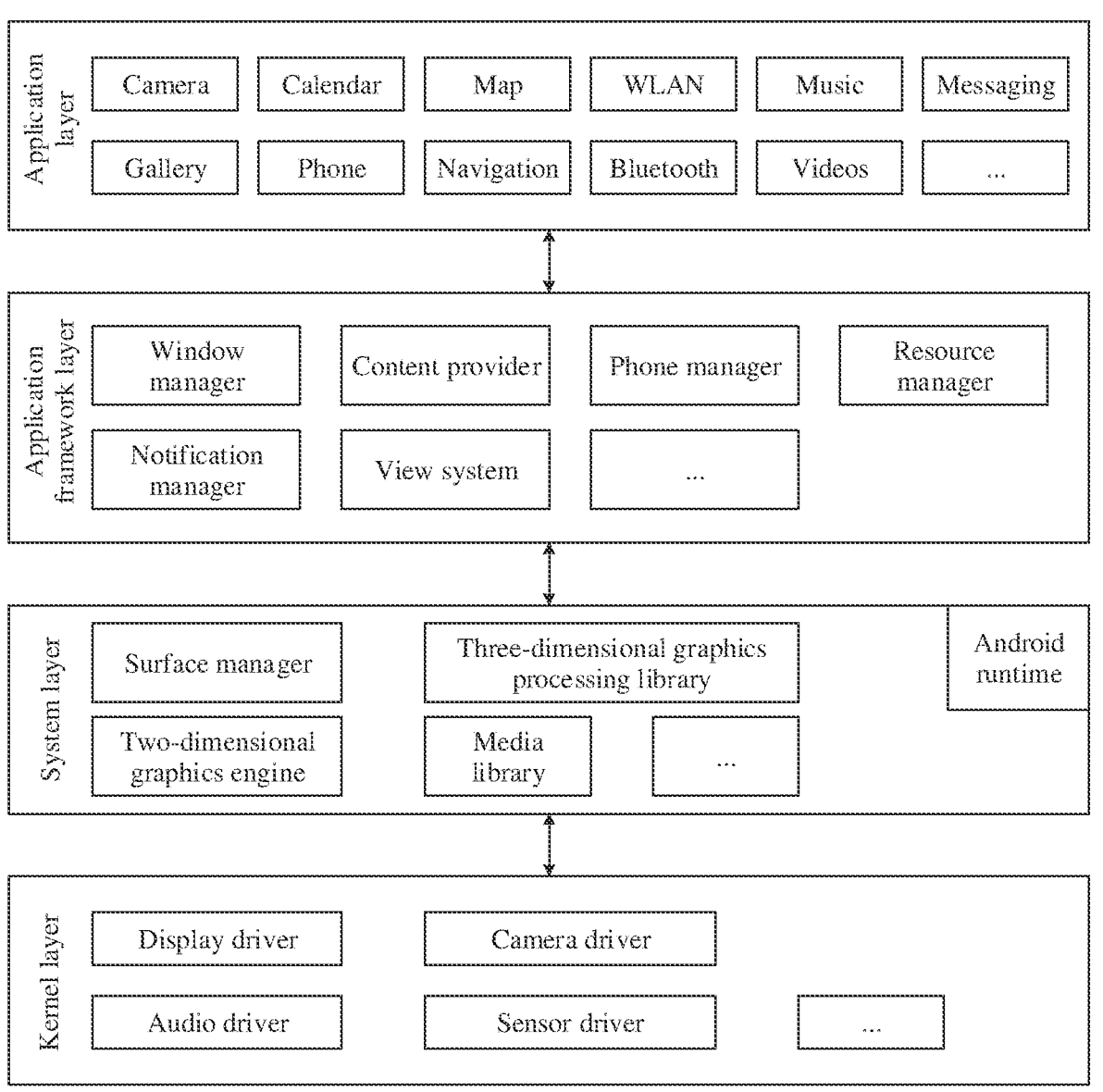
FIG. 6 is a schematic diagram of a software structure of a terminal device according to an embodiment of this application.

FIG. 6 is a block diagram of a software structure of a mobile phone according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 6, the application packages may include applications such as Camera, Gallery, Calendar, Phone, Map, Navigation, WLAN, Bluetooth, Music, Videos, and Messaging.

The application framework layer provides an API and a programming framework for an application of the application layer. The application framework layer includes some predefined functions.

As shown in FIG. 6, the application framework layer may include a window manager, a content provider, a view system, a phone manager, a resource manager, a notification manager, and the like.

The window manager is used to manage a window program. The window manager may obtain a size of the display, determine whether there is a status bar, perform screen locking, take a screenshot, and the like.

The content provider is used to store and obtain data, and enable the data to be accessible by an application. The data may include a video, an image, audio, calls that are made and answered, a browsing history, a bookmark, a phone book, and the like.

The view system includes a visual control, for example, a text display control or an image display control. The view system may be used to construct an application. A display interface may include one or more views. For example, a display interface including an SMS message notification icon may include a text display view and an image display view.

The phone manager is used to provide a communication function of the mobile phone 500, for example, management of a call status (including answering, declining, and the like).

The resource manager provides various resources such as a localized character string, an icon, an image, a layout file, and a video file for an application.

The notification manager enables an application to display notification information in a status bar, and may be used to convey a notification message. The notification manager may automatically disappear after a short pause without user interaction. For example, the notification manager is used to notify download completion, give a message notification, and the like. The notification manager may be alternatively a notification that appears in a top status bar of the system in a form of a graph or a scroll bar text, for example, a notification of an application that is run in the background, or may be a notification that appears on a screen in a form of a dialog window. For example, text information is prompted in the status bar, an announcement is given, the mobile phone vibrates, or the indicator light blinks.

The Android runtime includes a kernel library and a virtual machine. The Android runtime is responsible for scheduling and management of the Android system.

The kernel library includes two parts: a function that needs to be invoked in a Java language and a kernel library of Android.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of function modules, for example, a surface manager (surface manager), a media library (Media Library), a three-dimensional graphics processing library (for example, an OpenGL ES), and a 2D graphics engine (for example, an SGL).

The surface manager is used to manage a display subsystem and provide fusion of 2D and 3D layers for a plurality of applications.

The media library supports playback and recording in a plurality of frequently used audio and video formats, a static image file, and the like. The media library may support a plurality of audio and video encoding formats such as MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

According to the permission management method provided in embodiments of this application, when detecting that an APP is being installed, a mobile phone determines whether one or more permissions that the APP needs to apply for during running include a special permission. When determining that the one or more permissions that the APP needs to apply for during running include the special permission, the mobile phone detects whether an installation package of the APP includes a valid special permission certificate for the APP. When determining that the installation package of the APP includes the valid special permission certificate for the APP, the mobile phone verifies, based on a special permission that the APP is allowed to apply for during running and that is recorded in the special permission certificate, the special permission that the APP needs to apply for during running. For a special permission that fails to pass verification, the mobile phone may set the special permission to an unavailable state. In this way, during running, the APP cannot apply for the special permission that is set to the unavailable state, thereby reducing a possibility that the special permission is abused by the APP. Because the APP cannot apply for the special permission, that is set to the unavailable state, during running, the APP cannot obtain, during running, data managed and controlled by the special permission that is set to the unavailable state. Therefore, security of a terminal system can be improved, and a risk of leaking privacy data of a user can be reduced.

Figure 7A:
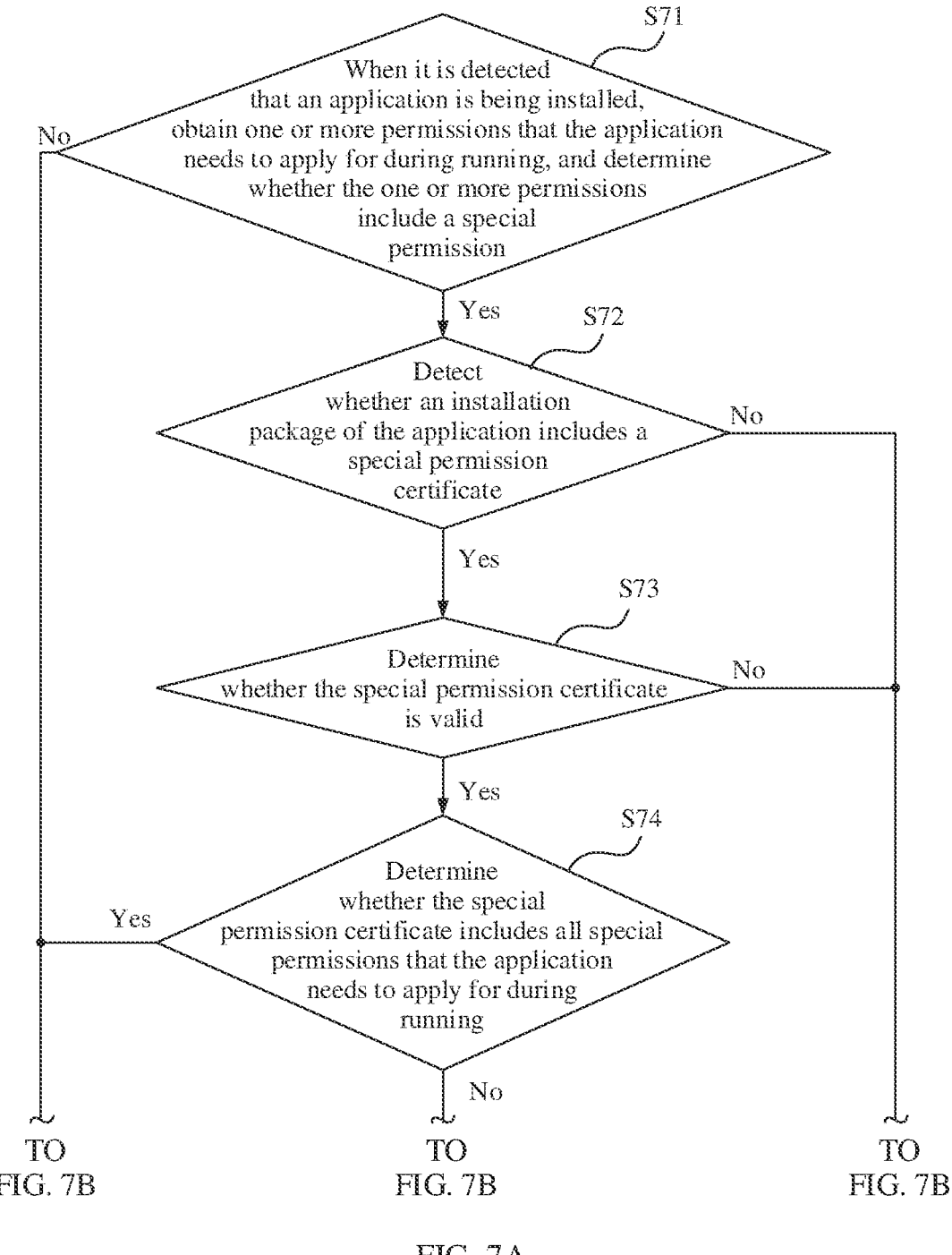

As shown in FIG. 7A and FIG. 7B, a permission management method provided in an embodiment of this application may include the following steps.

S71: When detecting that an application is being installed, a mobile phone obtains one or more permissions that the application needs to apply for during running, and determines whether the one or more permissions include a special permission.

In this embodiment of this application, when detecting an operation of indicating, by a user, to install the APP or an operation of indicating, by a user, to update the APP, the mobile phone determines that the APP is detected to be installed.

Figure 8A:
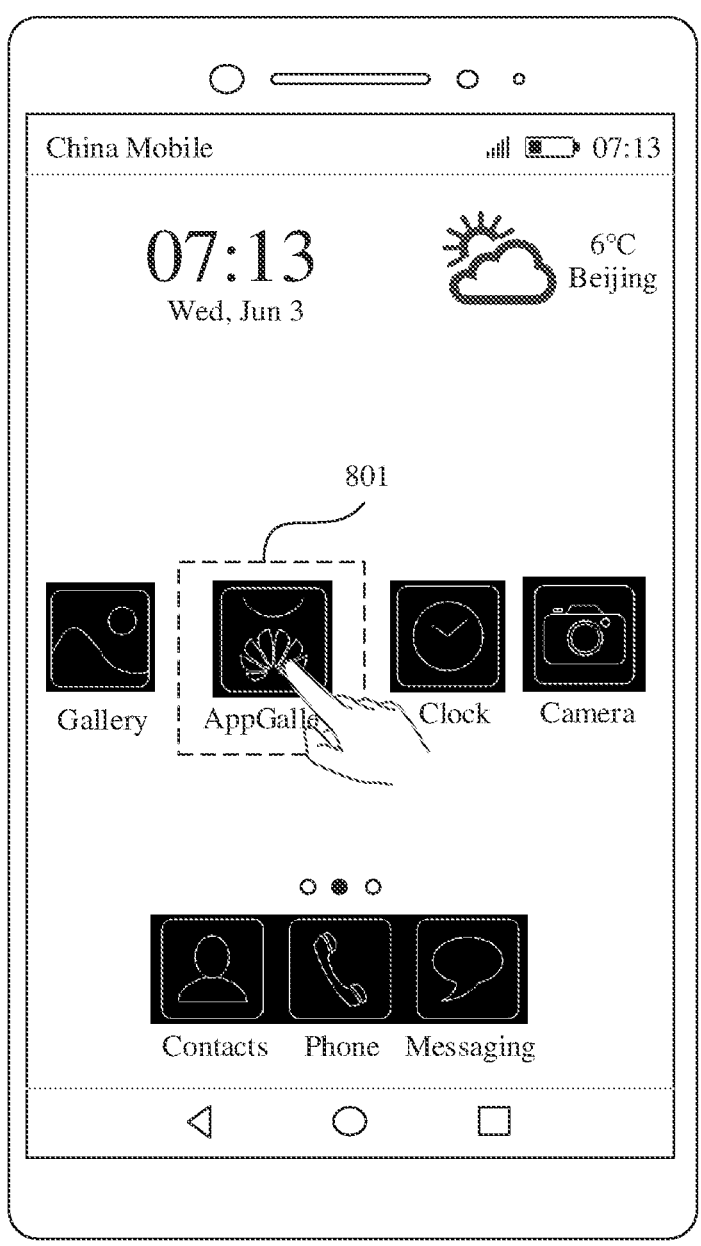
FIG. 8(a) to FIG. 8(c) are a schematic diagram of one group of interfaces according to an embodiment of this application.
Figure 8B:
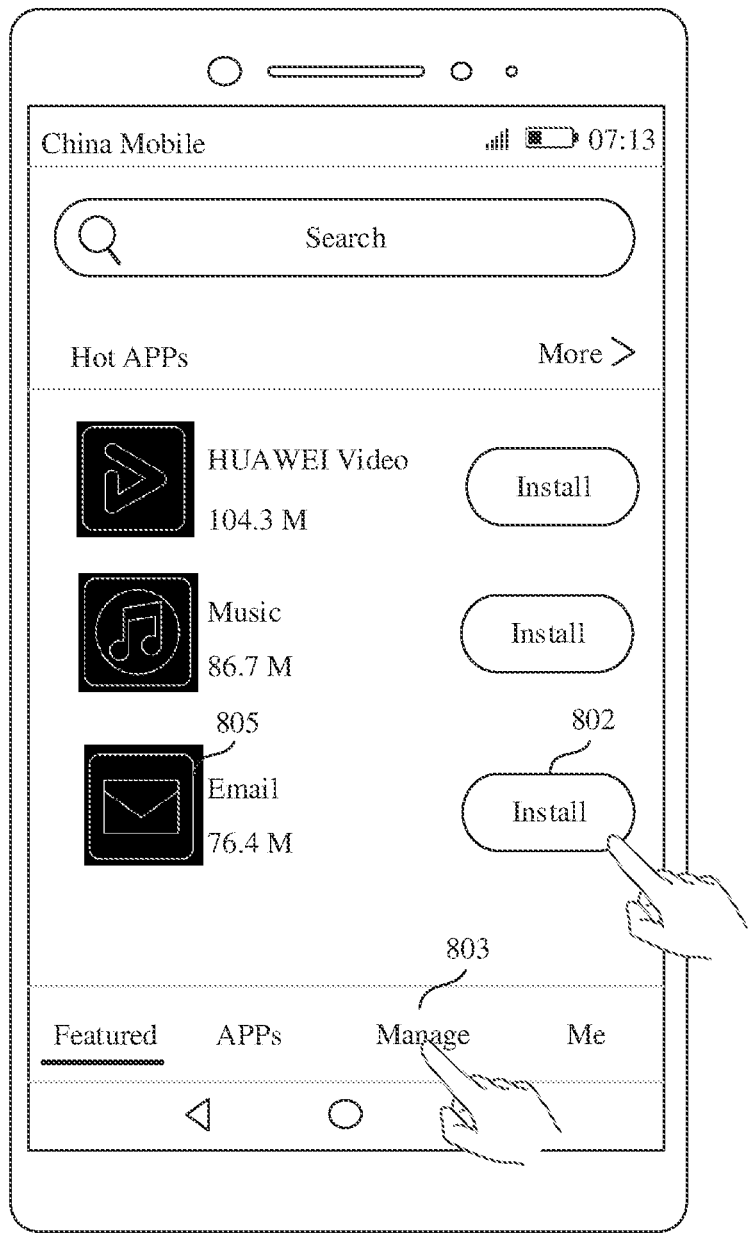
Figure 8C:
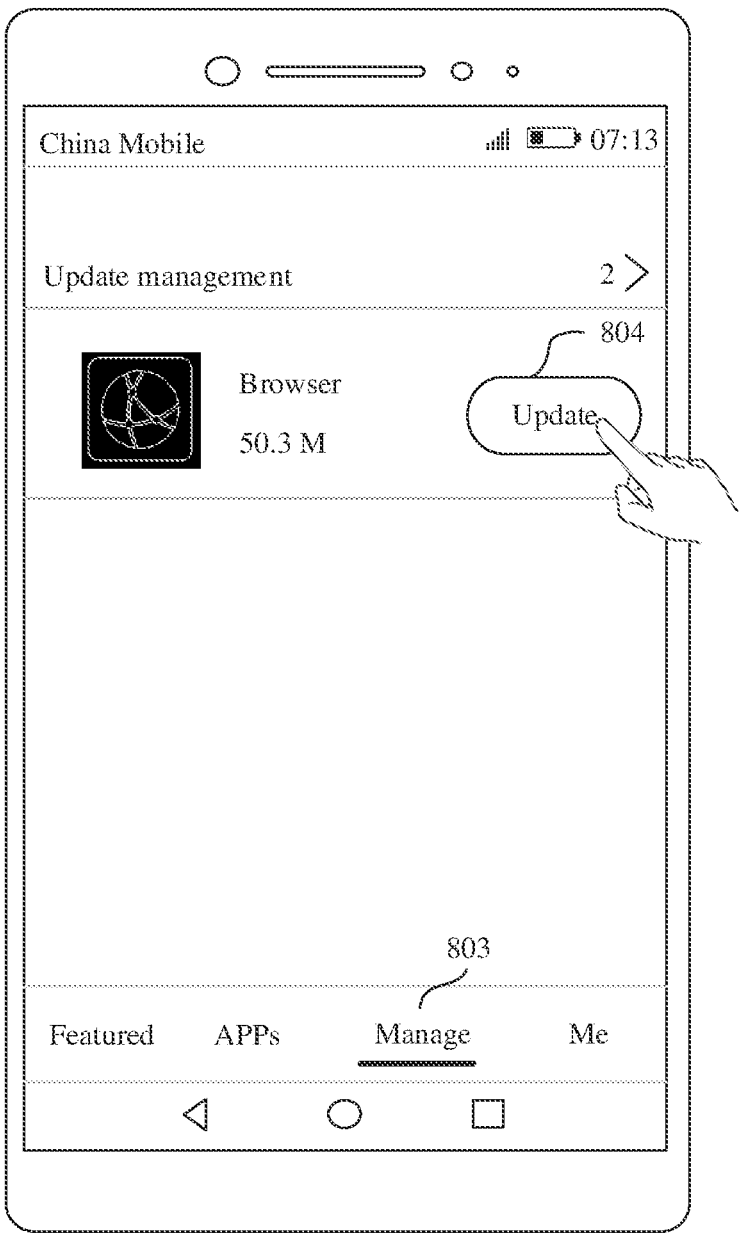

For example, as shown in FIG. 8(a) to FIG. 8(c), when the mobile phone detects that the user taps an icon 801 of an AppGallery APP shown in FIG. 8(a), the mobile phone opens the AppGallery APP, and displays an interface shown in FIG. 8(b). When detecting that the user taps an "Install" control 802 corresponding to a first APP (for example, an email APP) 805 shown in FIG. 8(b), the mobile phone determines that an operation of indicating, by the user, to install the first APP 805 is detected. Alternatively, when detecting that the user taps a "Manage" control 803 shown in FIG. 8(b), the mobile phone displays an interface shown in FIG. 8(c). When detecting that the user taps an "Update" control 804 corresponding to a browser APP shown in FIG. 8(c), the mobile phone determines that an operation of indicating, by the user, to install the browser APP is detected.

When detecting the operation of indicating, by the user, to install the APP, the mobile phone may obtain an installation package of the APP, and check the installation package of the APP. By way of example and not limitation, the mobile phone may obtain, from the AppGallery APP, the installation package that is of the APP and that has been launched to AppGallery.

A process in which the mobile phone checks the installation package of the APP may include:

1. The mobile phone detects whether the installation package of the APP includes a permission configuration file.

2. When the installation package of the APP includes the permission configuration file, the mobile phone obtains, from the permission configuration file, the one or more permissions that the APP needs to apply for during running, and determines whether the one or more permissions include the special permission.

In an embodiment of this application, when checking the installation package of the APP, the mobile phone may display installation progress of the APP and/or indicate that the APP is being installed.

Figure 9A:
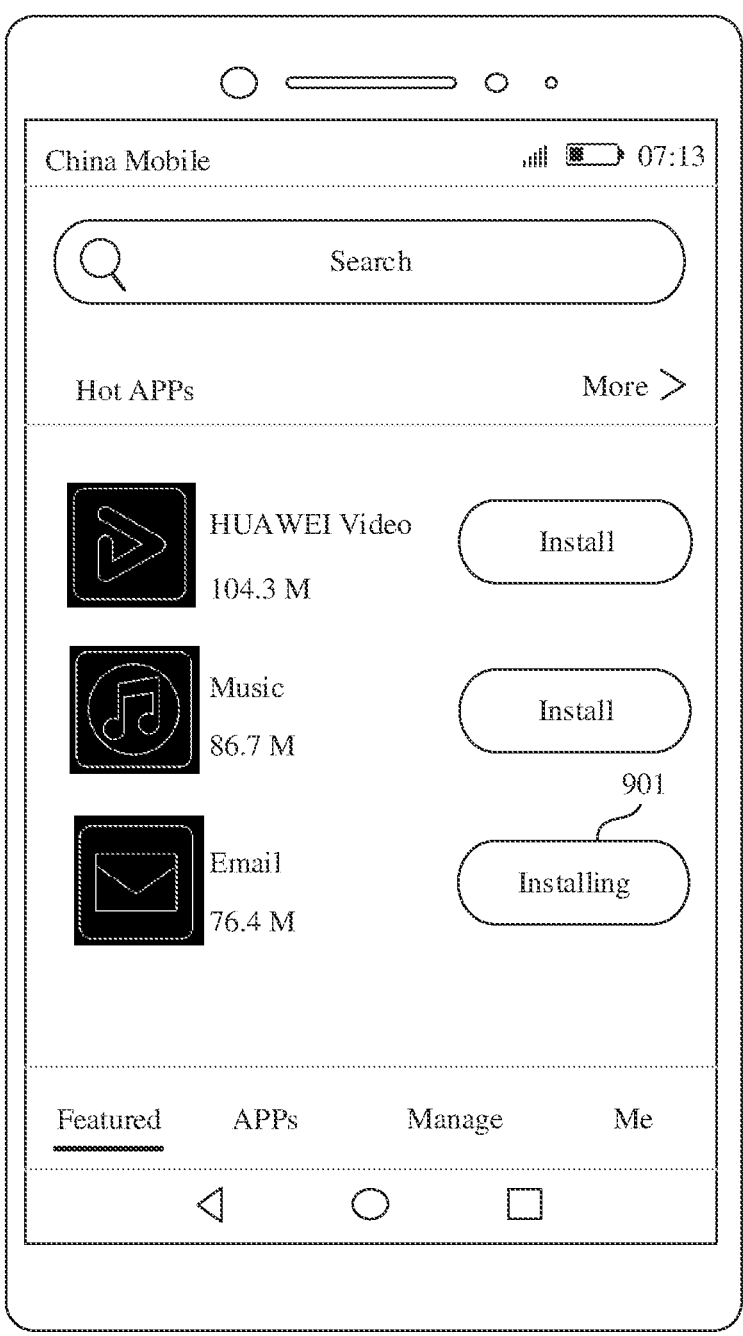
FIG. 9(a) and FIG. 9(b) are a schematic diagram of another group of interfaces according to an embodiment of this application.
Figure 9B:
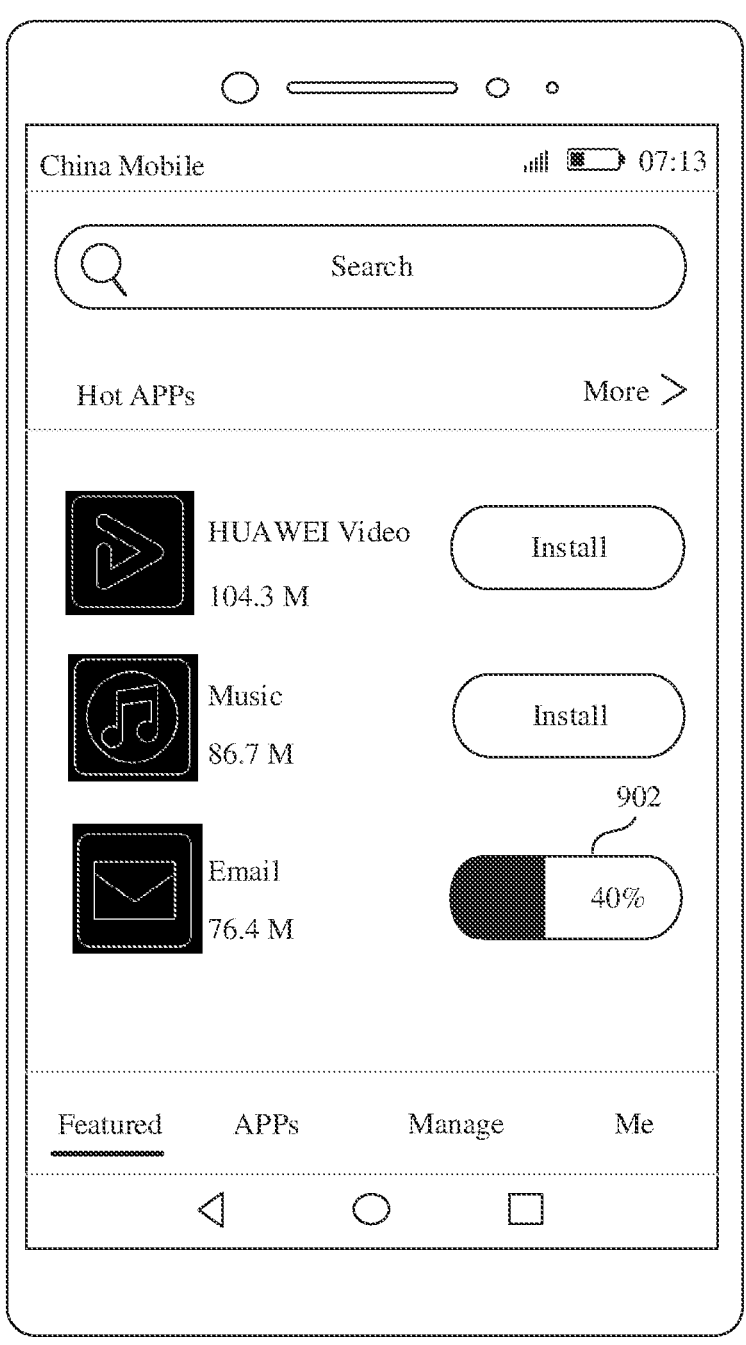

For example, when detecting that the user taps the "Install" control 802 corresponding to the first APP 805 shown in FIG. 8(b), the mobile phone obtains an installation package of the first APP 805, and checks the installation package of the first APP 805. When checking the installation package of the first APP 805, the mobile phone may switch the "Install" control 802 corresponding to the first APP 805 on the interface shown in FIG. 8(b) to an "Installing" control 901 on an interface shown in FIG. 9(a), to indicate to the user that the APP is being installed, or switch to an installation progress control 902 on an interface shown in FIG. 9(b).

In another embodiment of this application, when the mobile phone checks the installation package of the APP, if the mobile phone detects that the installation package of the APP includes the permission configuration file, the mobile phone may further display the one or more permissions the APP needs to apply for during running and that are recorded in the permission configuration file.

Figure 10:
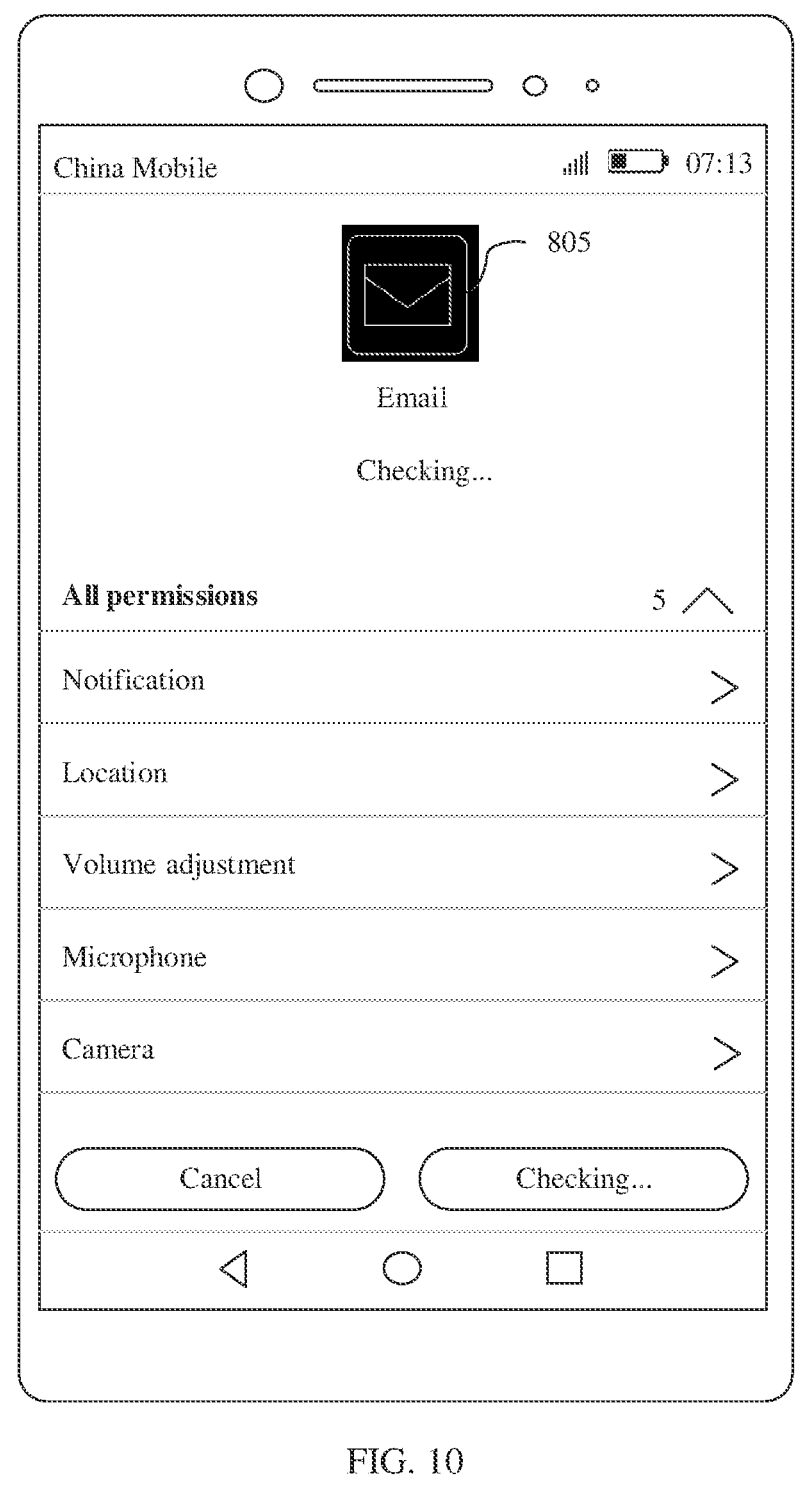

For example, when detecting that the user taps the "Install" control 802 corresponding to the first APP 805 shown in FIG. 8(b), the mobile phone obtains the installation package of the first APP 805, and checks the installation package of the first APP 805. When the mobile phone checks the installation package of the first APP 805, if the mobile phone detects that the following five permissions are recorded in a permission configuration file in the installation package of the first APP 805: a notification permission, a location permission, a volume adjustment permission, a microphone permission, and a camera permission, the mobile phone may display an interface shown in FIG. 10. The foregoing five permissions that the first APP 805 needs to apply for during running are displayed on the interface.

In this embodiment of this application, the process in which the mobile phone checks the installation package of the APP may further include subsequent S72 to S76.

Specifically, in an embodiment of this application, when the mobile phone determines that the one or more permissions that APP needs to apply for during running include the special permission, S72 is performed.

In another embodiment of this application, when determining that the one or more permissions that the APP needs to apply for during running do not include the special permission, the mobile phone completes checking the installation package of the APP. In this case, the mobile phone performs S77.

S72: The mobile phone detects whether the installation package of the application includes a special permission certificate. The special permission certificate is used to record a special permission that the application is allowed to apply for during running.

In this embodiment of this application, when detecting that the installation package of the APP includes an electronic file whose format is a preset format and whose name carries a special permission certificate identifier, the mobile phone determines that the installation package of the APP includes the special permission certificate. When detecting that the installation package of the APP does not include an electronic file whose format is a preset format and whose name carries a special permission certificate identifier, the mobile phone determines that the installation package of the APP does not include the special permission certificate.

In an embodiment of this application, the mobile phone performs S73 when determining that the installation package of the APP includes the special permission certificate.

In another embodiment of this application, the mobile phone performs S76 when determining that the installation package of the APP does not include the special permission certificate.

S73: The mobile phone determines whether the special permission certificate is valid.

In this embodiment of this application, a process in which the mobile phone determines whether the special permission certificate is valid may include:

1. The mobile phone determines whether the special permission certificate is issued by a permission service organization.

2. The mobile phone determines whether a current time point is within a validity period of the special permission certificate. The current time point may be a time point at which the mobile phone detects that the APP is being installed.

In this embodiment of this application, because a special permission certificate issued by the permission service organization to the APP is usually a special permission certificate with a digital signature, that the mobile phone determines whether the special permission certificate is issued by the permission service organization may specifically include: The mobile phone performs signature verification on the special permission certificate by using a public key of the permission service organization. The public key of the permission service organization may be obtained by the mobile phone from the server 300 of the permission service organization.

If the mobile phone successfully performs signature verification on the special permission certificate by using the public key of the permission service organization, the mobile phone determines that the special permission certificate is issued by the permission service organization. If the mobile phone fails to perform signature verification on the special permission certificate by using the public key of the permission service organization, the mobile phone determines that the special permission certificate is not issued by the permission service organization. It should be noted that, when the mobile phone successfully performs signature verification on the special permission certificate, the mobile phone may obtain content of the special permission certificate, or when the mobile phone fails to perform signature verification on the special permission certificate, the mobile phone cannot obtain content of the special permission certificate.

In an embodiment of this application, after obtaining the content of the special permission certificate, if the mobile phone detects that the content of the special permission certificate includes the validity period of the special permission certificate, and the current time point is within the validity period of the special permission certificate, it indicates that the special permission certificate does not expire. Therefore, the mobile phone may determine that the special permission certificate is valid, and perform S74.

In another embodiment of this application, after obtaining the content of the special permission certificate, if the mobile phone detects that the content of the special permission certificate includes the validity period of the special permission certificate, and the current time point is not within the validity period of the special permission certificate, it indicates that the special permission certificate has expired. Therefore, the mobile phone may determine that the special permission certificate is invalid, and perform S76.

In still another embodiment of this application, after obtaining the content of the special permission certificate, if the mobile phone detects that the content of the special permission certificate does not include the validity period of the special permission certificate, the mobile phone determines that the current time point is within the validity period of the special permission certificate, that is, determines that the special permission certificate is valid, and performs S74.

In yet still another embodiment of this application, when determining that the special permission certificate is not issued by the permission service organization, the mobile phone determines that the special permission certificate is invalid, and performs S76.

S74: The mobile phone determines whether the special permission certificate includes all special permissions that the application needs to apply for during running.

The special permission certificate is used to record the special permission that is allowed to be applied for by the APP during running. In other words, a special permission that is included in the special permission certificate is a special permission that is allowed to be applied for by the APP during running, and a special permission that is not included in the special permission certificate is a special permission that is not allowed to be applied for by the APP during running. Therefore, after determining that the special permission certificate in the installation package of the APP is valid, the mobile phone determines whether the special permission certificate includes all the special permissions that the APP needs to apply for during running.

In an embodiment of this application, the mobile phone performs S75 when determining that at least one special permission in the special permission that the APP needs to apply for during running is not included in the special permission certificate of the APP.

In another embodiment of this application, when determining that all the special permissions the APP needs to apply for during running are included in the special permission certificate of the APP, the mobile phone completes checking the installation package of the APP. In this case, the mobile phone performs S77.

S75: The mobile phone sets, to an unavailable state, the special permission that is not included in the special permission certificate in the special permission that the application needs to apply for during running.

In this embodiment of this application, after the mobile phone sets, to the unavailable state, the special permission that is not included in the special permission certificate in the permission that the APP needs to apply for during running, the APP cannot apply for the special permission in the unavailable state during running, and cannot obtain data managed and controlled by the special permission in the unavailable state. In this way, security of a terminal system can be improved, and a risk of leaking privacy data of the user can be reduced.

The special permission that is not included in the special permission certificate may be all the special permissions that the APP needs to apply for during running, or may be some of the special permissions that the APP needs to apply for during running.

In an embodiment of this application, that the mobile phone sets, to the unavailable state, the special permission that is not included in the special permission certificate in the permission that the APP needs to apply for during running may specifically include:

The mobile phone deletes, from the permission that the APP needs to apply for during running, the special permission that is not included in the special permission certificate.

It should be noted that a permission that is not deleted in the permission that the APP needs to apply for during running is a permission that is allowed to be applied for by the APP during running. The permission that is not deleted may include a normal permission and/or the special permission.

In this embodiment, after deleting, from the permission that the APP needs to apply for during running, the special permission that is not included in the special permission certificate, the mobile phone may display only the permission that is not deleted in the permission that the APP needs to apply for during running, and indicate that the permission that is not deleted is a permission that is allowed to be applied for by the APP during running.

Figure 11A:
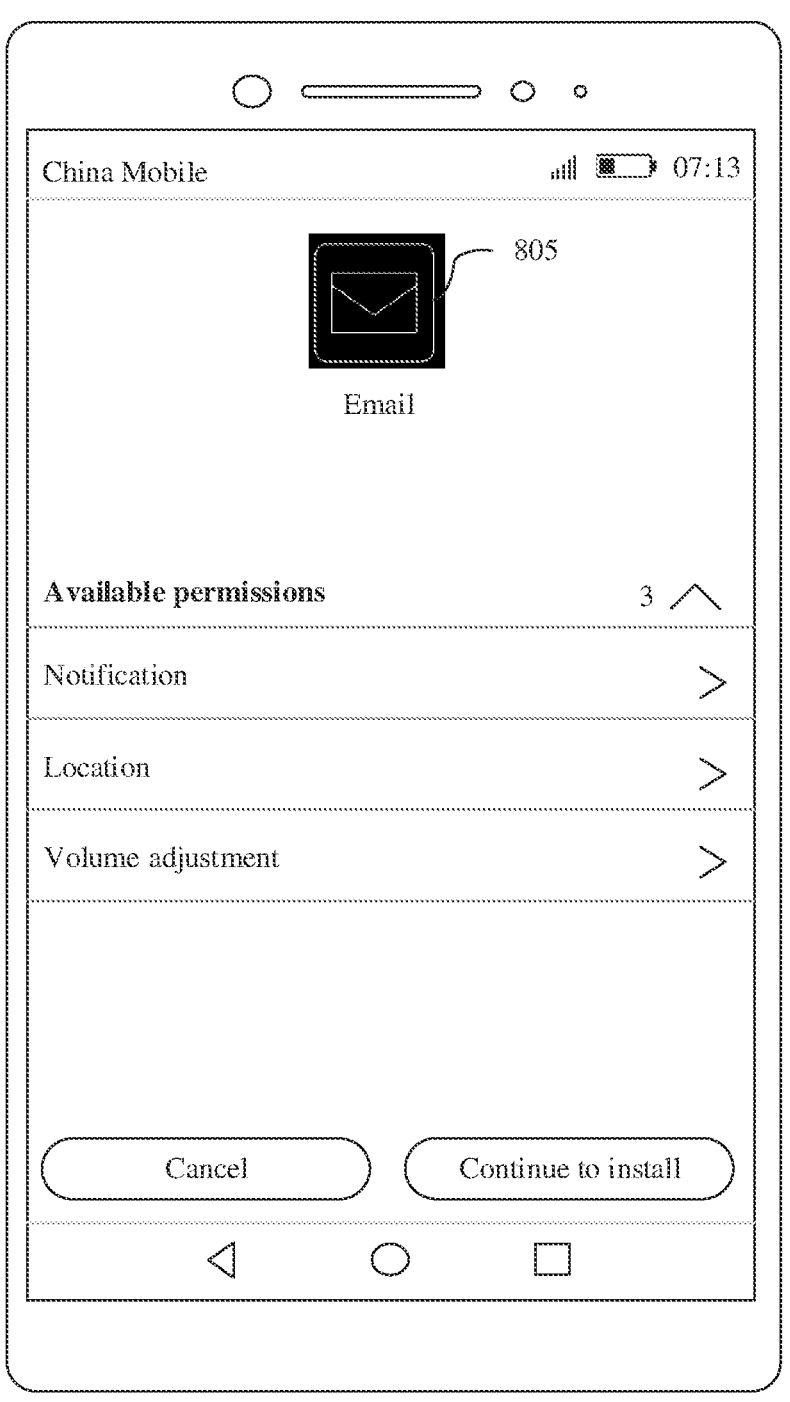
FIG. 11(a) to FIG. 11(d) are a schematic diagram of still another group of interfaces according to an embodiment of this application.

In an example, as shown in FIG. 11(a), the permissions that the first APP 805 needs to apply for during running include the notification permission, the location permission, the volume adjustment permission, the microphone permission, and the camera permission. The notification permission and the volume adjustment permission are normal permissions, and the location permission, the microphone permission, and the camera permission are special permissions. In addition, the location permission is included in the special permission certificate, but the microphone permission and the camera permission are not included in the special permission certificate. In this case, after deleting the microphone permission and the camera permission from the permissions that the first APP 805 needs to apply for during running, the mobile phone may display an interface shown in FIG. 11(a). Only the notification permission, the location permission, and the volume adjustment permission that are allowed to be applied for by the first APP 805 during running are displayed on the interface.

Figure 11B:
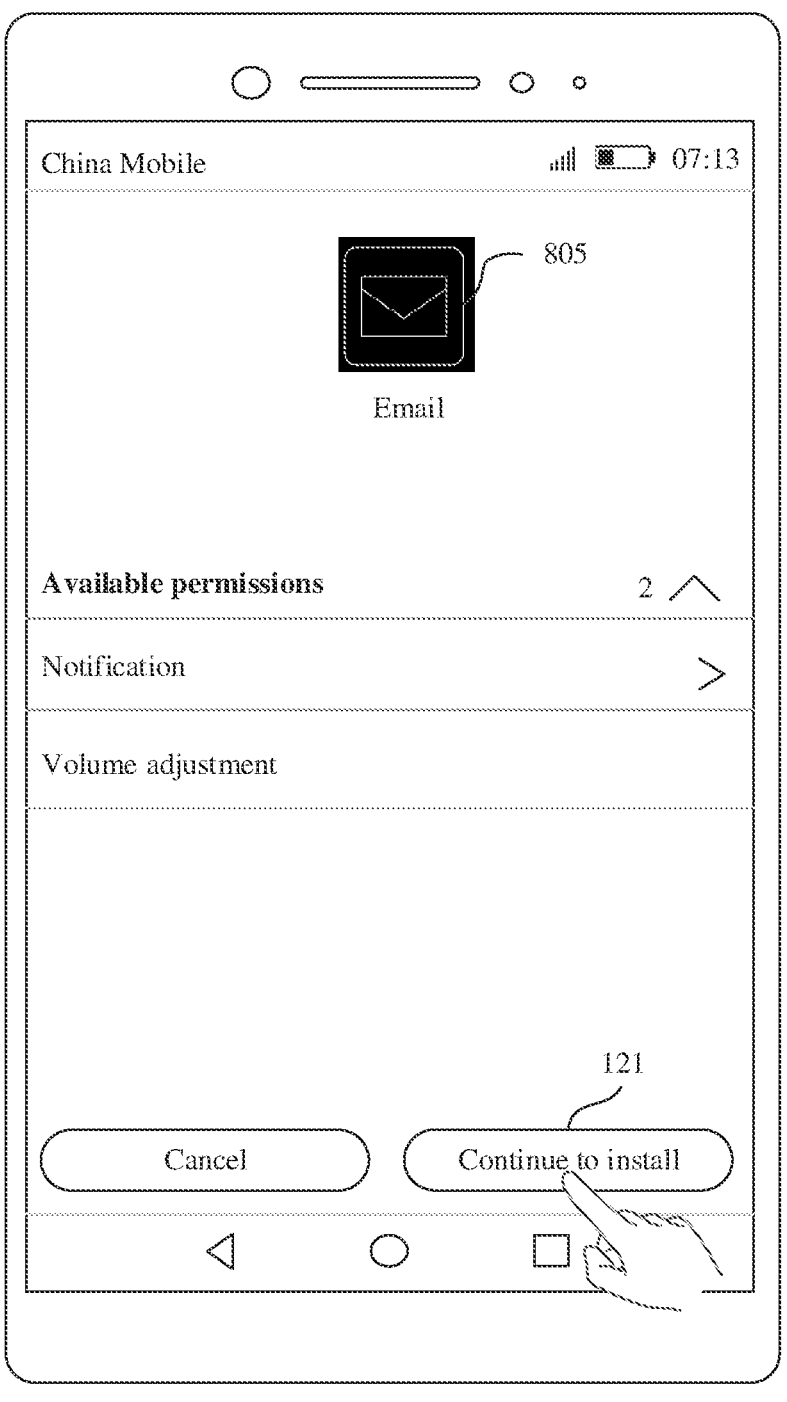

In another example, as shown in FIG. 11(b), if all the special permissions (the location permission, the microphone permission, and the camera permission) that the first APP 805 needs to apply for during running are not included in the special permission certificate, after deleting all the special permissions from the permissions that the first APP 805 needs to apply for during running, the mobile phone may display an interface shown in FIG. 11(b). Only the notification permission and the volume adjustment permission that are allowed to be applied for by the first APP 805 during running are displayed on the interface.

In another embodiment of this application, that the mobile phone sets, to the unavailable state, the special permission that is not included in the special permission certificate in the permission that the APP needs to apply for during running may specifically include:

The mobile phone marks the special permission that is not included in the special permission certificate in the permission that the APP needs to apply for during running.

It should be noted that, in the permission that the APP needs to apply for during running, the marked special permission is a special permission that is not allowed to be applied for by the APP during running, and an unmarked permission is a permission that is allowed to be applied for by the APP during running. The unmarked permission may include a normal permission and/or the special permission.

In this embodiment, after marking the special permission that is not included in the special permission certificate in the permission that the APP needs to apply for during running, the mobile phone may display both the marked special permission and the unmarked permission in the permission that the APP needs to apply for during running, and indicate that the unmarked permission is a permission that is allowed to be applied for by the APP during running and that the marked special permission is a permission that is not allowed to be applied for by the APP during running.

Figure 11C:
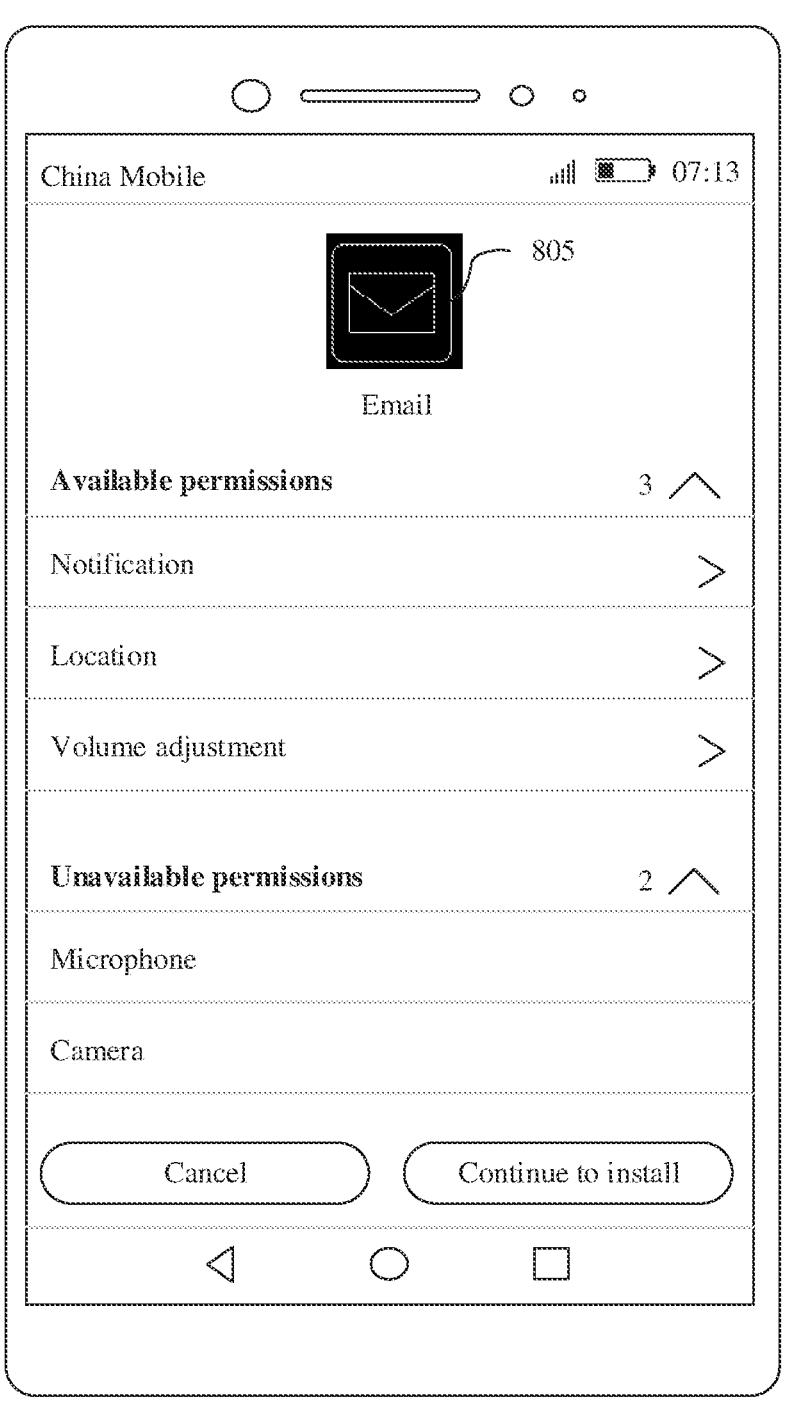

In an example, as shown in FIG. 11(c), the permissions that the first APP 805 needs to apply for during running include the notification permission, the location permission, the volume adjustment permission, the microphone permission, and the camera permission. The notification permission and the volume adjustment permission are normal permissions, and the location permission, the microphone permission, and the camera permission are special permissions. In addition, the location permission is included in the special permission certificate, but the microphone permission and the camera permission are not included in the special permission certificate. In this case, after marking the microphone permission and the camera permission in the permissions that the first APP 805 needs to apply for during running, the mobile phone may display an interface shown in FIG. 11(c). On the interface, the notification permission, the location permission, and the volume adjustment permission that are allowed to be applied for by the first APP 805 during running are displayed, and the microphone permission and the camera permission that are not allowed to be applied for by the first APP 805 during running are also displayed.

Figure 11D:
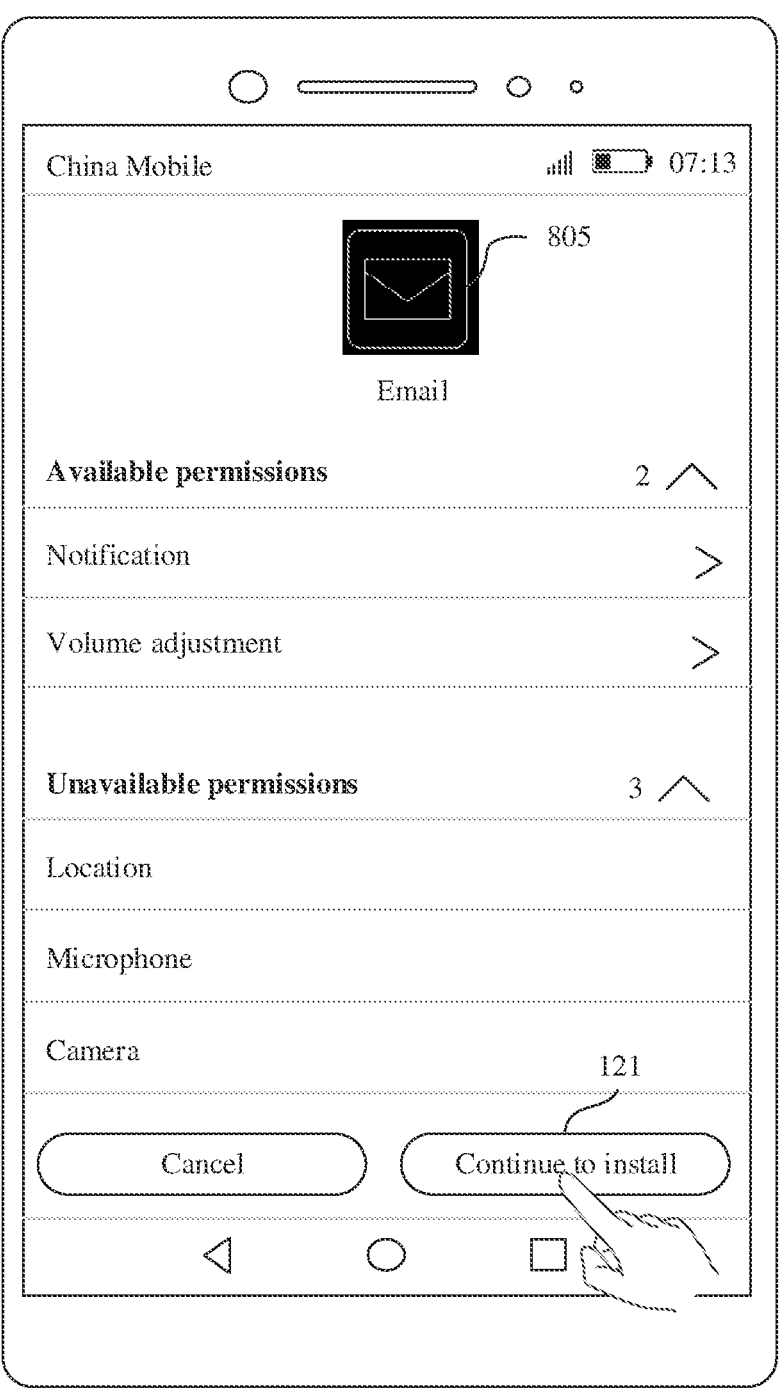

In another example, as shown in FIG. 11(d), if none of all the special permissions (the location permission, the microphone permission, and the camera permission) that the first APP 805 needs to apply for during running is included in the special permission certificate, after marking all the special permissions that the first APP 805 needs to apply for during running, the mobile phone may display an interface shown in FIG. 11(*d*). On the interface, the notification permission and the volume adjustment permission that are allowed to be applied for by the first APP 805 during running are displayed, and all the special permissions (the location permission, the microphone permission, and the camera permission) that are not allowed to be applied for by the first APP 805 during running are also displayed.

In this embodiment of this application, after setting, to the unavailable state, the special permission that is not included in the special permission certificate in the permission that the APP needs to apply for during running, the mobile phone completes checking the installation package of the APP. In this case, the mobile phone performs S77.

S76: The mobile phone sets, to an unavailable state, all the special permissions in the permission that the application needs to apply for during running.

It should be noted that S76 is similar to a case in which all the special permissions that the APP needs to apply for during running are not included in the special permission certificate in S75. For details, refer to related descriptions corresponding to the case in which all the special permissions that the APP needs to apply for by during running are not included in the special permission certificate in S75. Details are not described herein again.

In this embodiment of this application, after setting, to the unavailable state, all the special permissions in the permission that the APP needs to apply for during running, the mobile phone completes checking the installation package of the APP. In this case, the mobile phone performs S77.

S77: The mobile phone continues to install the application.

In an embodiment of this application, after completing checking the installation package of the APP, the mobile phone may continue to install the APP after detecting an operation of indicating, by the user, to continue to install the APP.

Figure 12A:
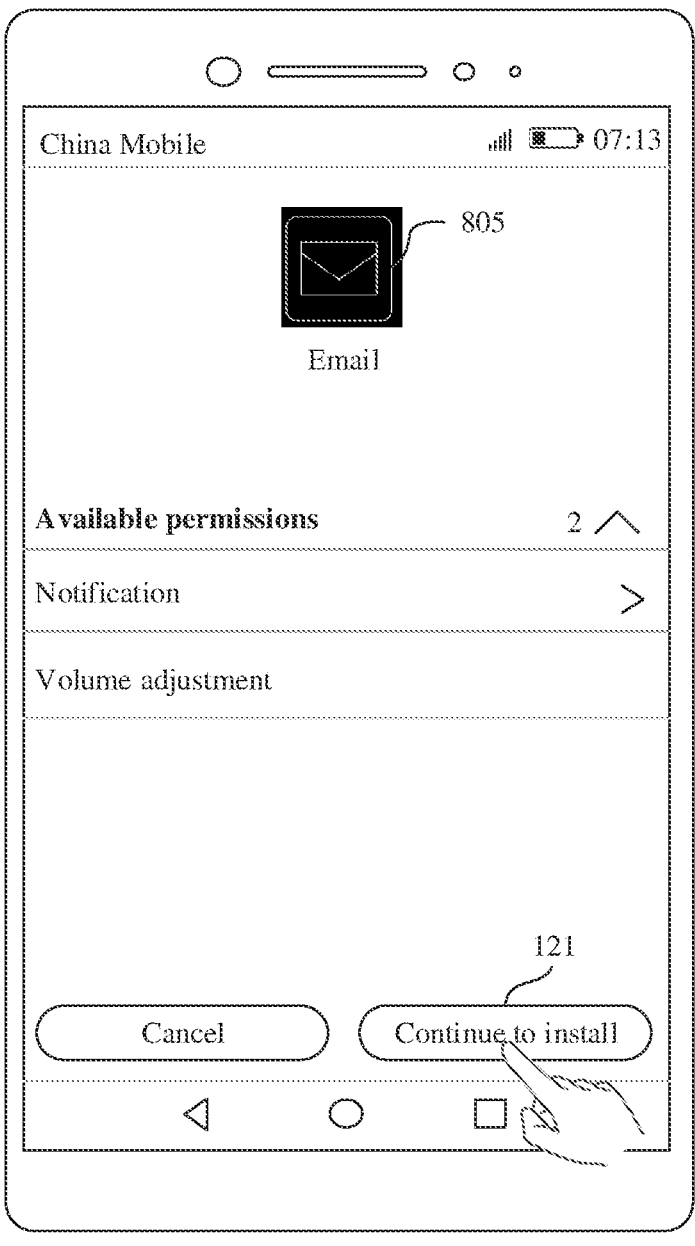
FIG. 12(a) and FIG. 12(b) are a schematic diagram of still another group of interfaces according to an embodiment of this application.
Figure 12B:
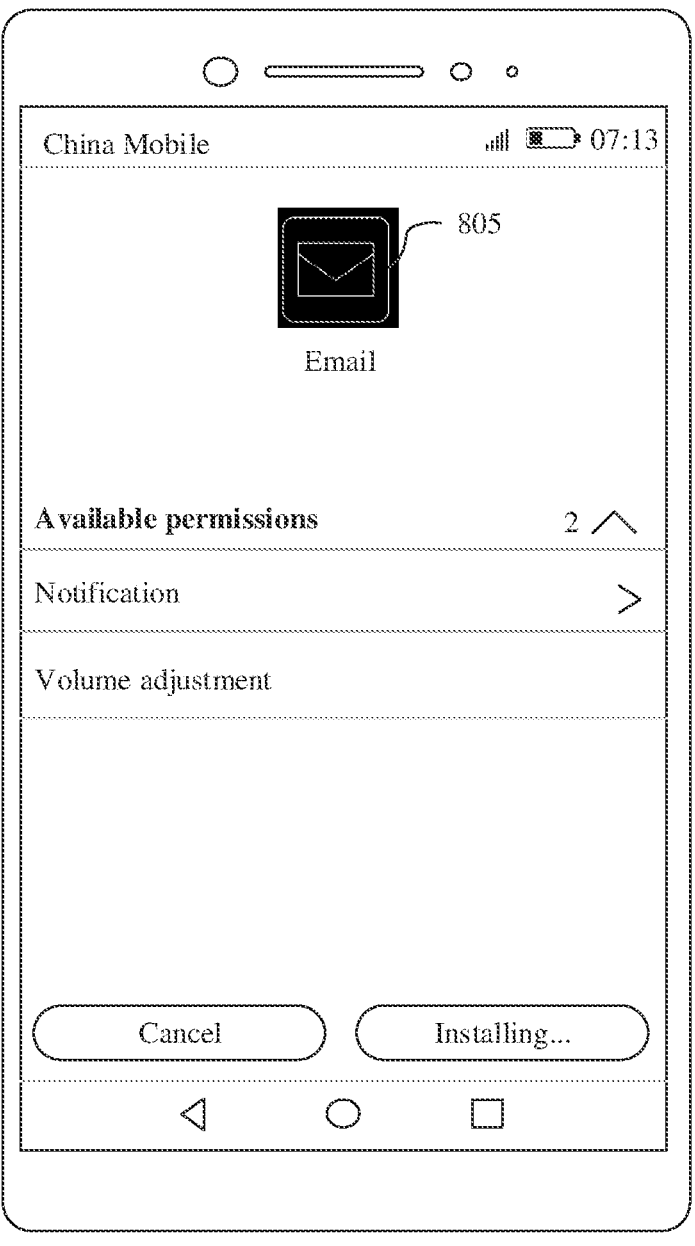

For example, as shown in FIG. 12(*a*) and FIG. 12(*b*), if all the special permissions (the location permission, the microphone permission, and the camera permission) that the first APP 805 needs to apply for during running are not included in the special permission certificate, after setting, to an unavailable state, all the special permissions that the first APP 805 needs to apply for during running, the mobile phone may display an interface shown in FIG. 12(*a*). When detecting that the user taps a "Continue to install" control 121 on an interface shown in FIG. 12(*a*), the mobile phone determines that an operation of indicating, by the user, to continue to install the APP is detected, and the mobile phone continues to install the first APP 805, and displays an interface shown in FIG. 12(*b*).

In another embodiment of this application, after completing checking the installation package of the APP, the mobile phone may automatically continue to install the APP.

For example, as shown in FIG. 12(*b*), if all the special permissions (the location permission, the microphone permission, and the camera permission) that the first APP 805 needs to apply for during running are not included in the special permission certificate, after setting, to an unavailable state, all the special permissions that the first APP 805 needs to apply for during running, the mobile phone may automatically continue to install the first APP 805, and directly display an interface shown in FIG. 12(*b*).

In this embodiment of this application, the mobile phone performs S77, so that after the APP is successfully installed, the mobile phone runs the APP when detecting an operation of indicating, by the user, to run the APP. During running, the APP may apply for a permission that is not set to an unavailable state in the permission configuration file of the APP.

It should be noted that, for an APP developed based on a permission management mechanism provided in this application, during running, the APP usually does not apply for a permission that is set to an unavailable state in a permission configuration file of the APP.

In an embodiment of this application, when the mobile phone runs the APP, if the mobile phone detects that a first permission that the APP applies for is a permission that is not set to an unavailable state in the permission configuration file of the APP, and a type of the first permission is a permission that needs to be granted by a terminal device, the mobile phone may directly grant the first permission to the APP, so that the APP has the first permission. In this way, the APP can invoke an API managed and controlled by the first permission, to implement a corresponding function.

In another embodiment of this application, when the mobile phone runs the APP, if the mobile phone detects that a first permission that the APP applies for is a permission that is not set to an unavailable state in the permission configuration file of the APP, and a type of the first permission is a permission that needs to be granted by the user, the mobile phone may display a grant request for the first permission. The grant request is used to determine whether the user allows granting the first permission to the APP. The mobile phone may grant the first permission to the APP when detecting an operation of indicating, by the user, to allow granting the first permission to the APP. The mobile phone may not grant the first permission to the APP when detecting an operation of indicating, by the user, not to allow granting the first permission to the APP.

By way of example and not limitation, that the mobile phone displays the grant request for the first permission may include: The mobile phone displays a prompt box on a display interface of the APP, and displays the grant request for the first permission in the prompt box.

Figure 13A:
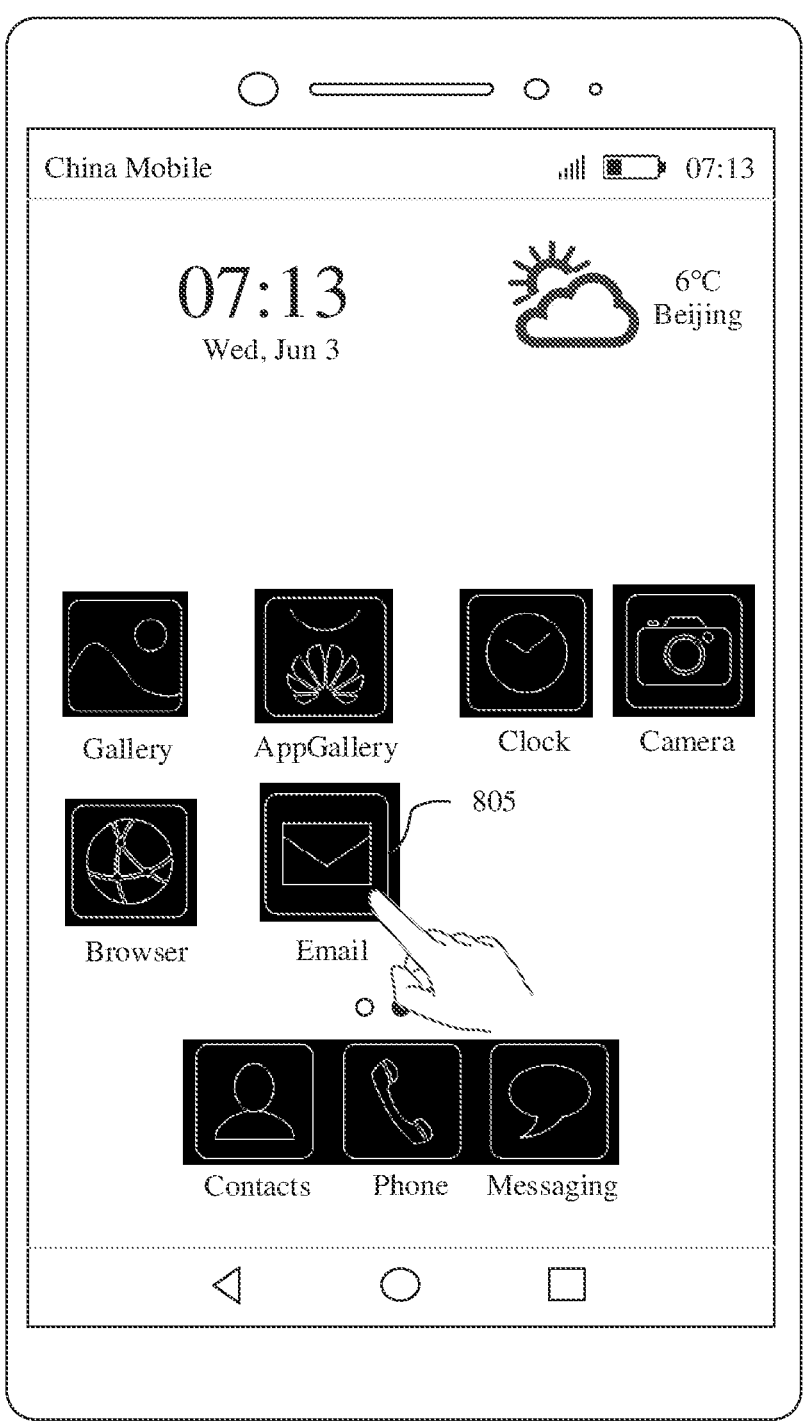
Figure 13B:
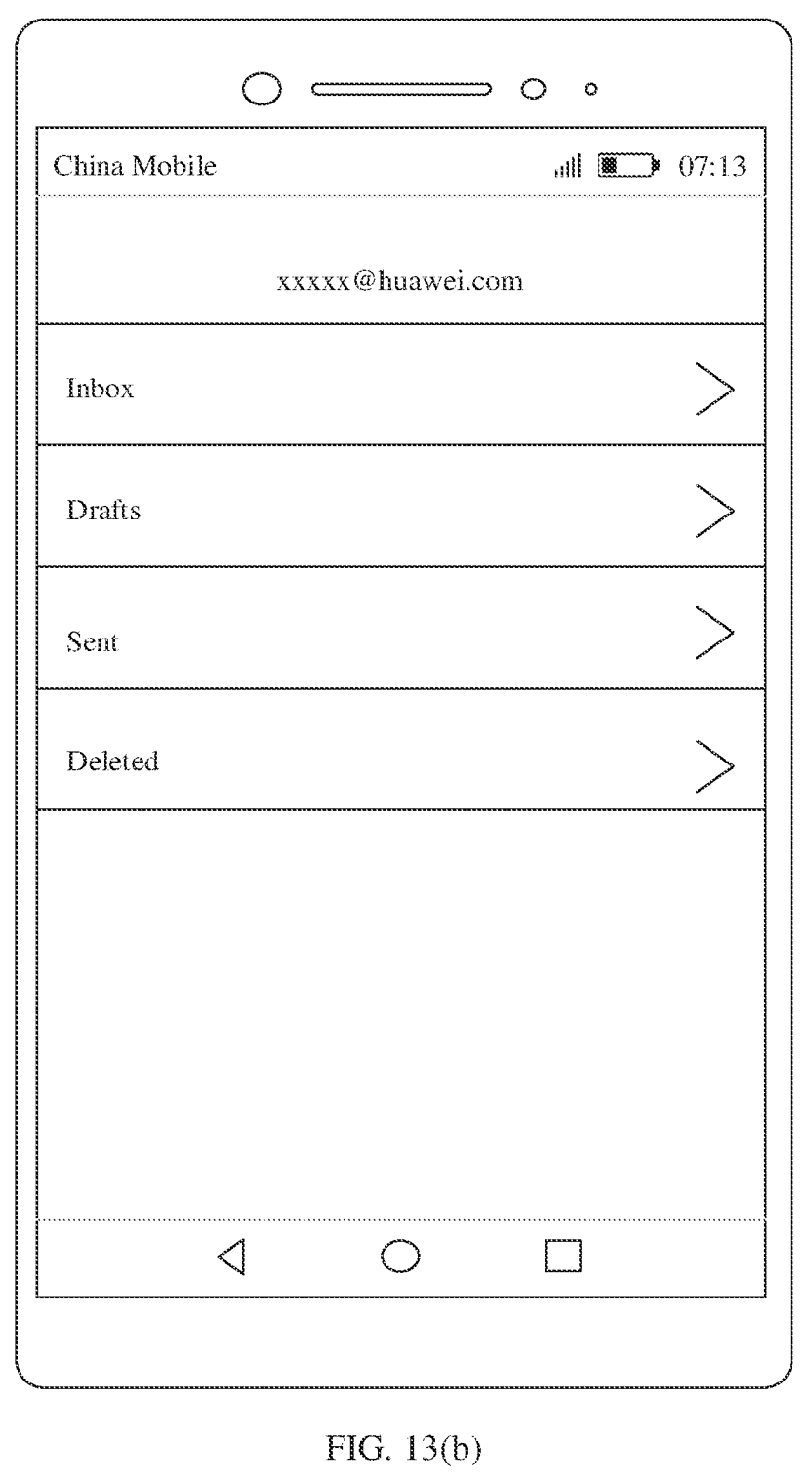
Figure 13C:
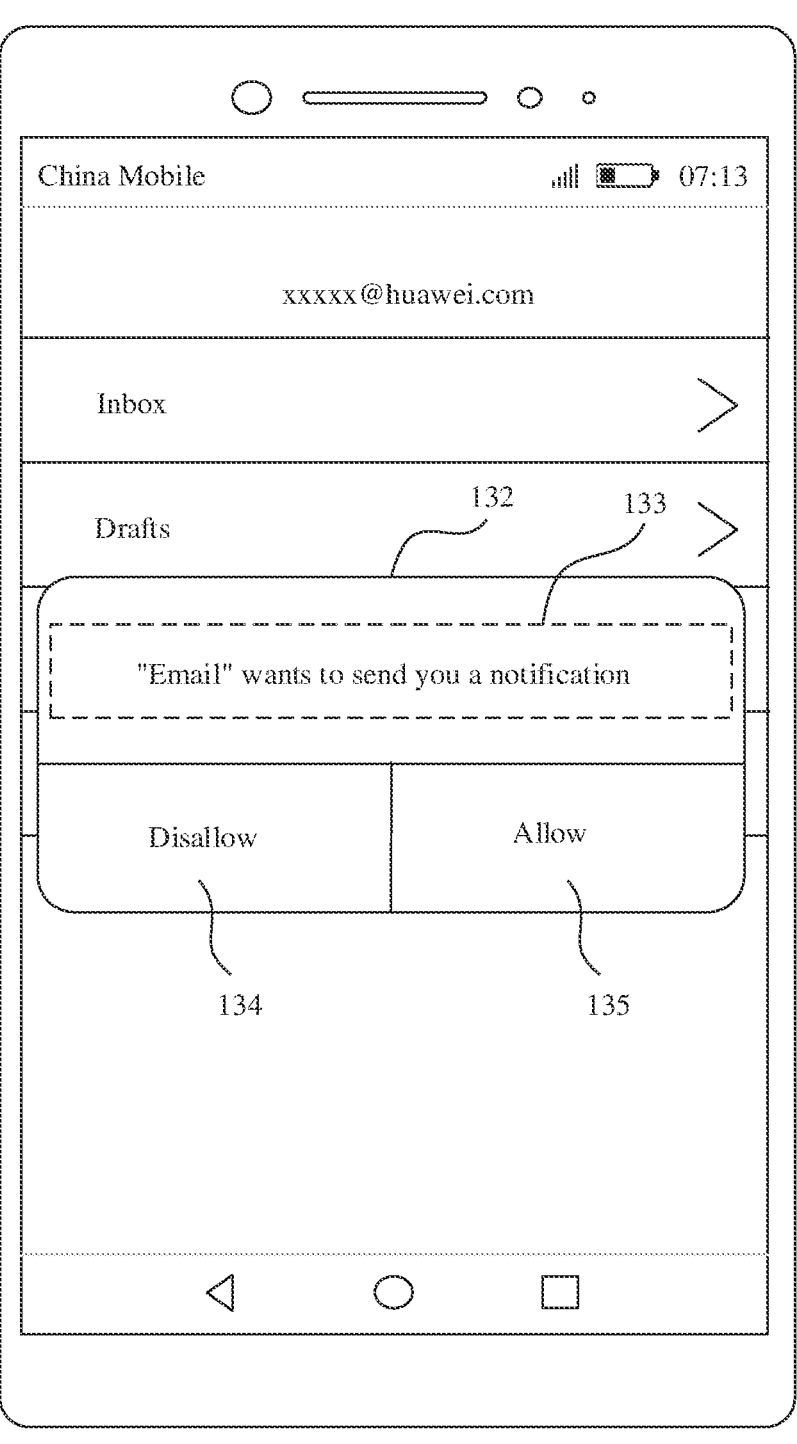

For example, as shown in FIG. 13(*a*) to FIG. 13(*c*), when detecting that the user taps an icon of the first APP 805 on an interface shown in FIG. 13(*a*), the mobile phone determines that an operation of indicating, by the user, to run the first APP 805 is detected. The mobile phone runs the first APP 805, and displays an interface shown in FIG. 13(*b*). When the mobile phone runs the first APP 805, if the mobile phone detects that the first APP 805 applies for the volume adjustment permission, because a type of the volume adjustment permission is a permission that needs to be granted by the terminal device, the mobile phone may directly grant the volume adjustment permission to the first APP 805. In this way, the first APP 805 has the volume adjustment permission, and the first APP 805 may invoke an API managed and controlled by the volume adjustment permission, to implement a volume adjustment function.

When the mobile phone runs the first APP 805, if the mobile phone detects that the first APP 805 applies for the notification permission, because the notification permission is a permission that needs to be granted by the user, the mobile phone may display, on a display interface of the first APP 805, a prompt box 132 shown in FIG. 13(*c*). A grant request 133 for the notification permission, a first control 134, and a second control 135 are displayed in the prompt box 132. The first control 134 is used by the user to reject the grant request, and the second control 135 is used by the user to agree to the grant request. When detecting that the user taps the first control 134 shown in FIG. 13(*c*), the mobile phone determines that an operation of indicating, by the user, not to allow granting the notification permission to the first APP 805 is detected. In this case, the mobile phone does not grant the notification permission to the first APP 805. In this way, the first APP 805 cannot have the notification permission, and cannot implement a notification function. When detecting that the user taps the second control 135 shown in FIG. 13(*c*), the mobile phone determines that an operation of indicating, by the user, to allow granting the notification permission to the first APP 805 is detected. In this case, the mobile phone grants the notification permission to the first APP 805. In this way, the first APP 805 has the notification permission, and the first APP 805 may invoke an API managed and controlled by the notification permission, to implement a notification function.

In this embodiment, the APP is allowed, during running, to apply for only the special permission that is not set to the unavailable state in the permission configuration file of the APP, and the APP is not allowed, during running, to apply for the special permission that is set to the unavailable state in the permission configuration file of the APP. Therefore, when running an APP, the mobile phone displays a prompt box only for a permission that is not set to an unavailable state in a permission configuration file of the APP and whose type is a permission that needs to be granted by the user. Compared with that an existing permission management method displays prompt boxes for all permissions, whose types are permissions that need to be granted by the user, in the permission configuration file of the APP, this can reduce impact of display operations of the prompt boxes on a running process of the APP.

In this embodiment of this application, after the mobile phone grants the first permission to the APP, when detecting that the APP invokes the API managed and controlled by the first permission, the mobile phone may return data managed and controlled by the permission to the APP. The data is real data corresponding to a service managed and controlled by the first permission, so that the application can obtain the service managed and controlled by the first permission.

For example, if the mobile phone grants the location permission to the first APP, when the first APP invokes an API managed and controlled by the location permission, the mobile phone may return, to the APP, positioning information currently obtained by using a positioning system.

In still another embodiment of this application, for an APP that is developed based on a conventional permission management mechanism and that has been launched, during running, the APP may apply for a special permission that is set to an unavailable state in a permission configuration file of the APP. If the APP cannot obtain, during running, data managed and controlled by a special permission recorded in the permission configuration file when the APP is launched, the APP may have an exception, for example, a crash. As a result, the APP cannot run normally.

Therefore, to avoid the foregoing case and improve compatibility of the terminal system, when installing the APP, if the mobile phone checks an installation package of the APP by using S71 to S76, and sets at least one special permission in the permission configuration file of the APP to an unavailable state during the check, after performing S71 to S76, and before performing S77, the mobile phone may further perform S78 in FIG. 7A and FIG. 7B. Details are as follows.

S78: The mobile phone establishes an unavailable permission list in the installation package of the application, and records, in the unavailable permission list, the special permission that is set to the unavailable state in the permission that the application needs to apply for during running.

The permission that the APP needs to apply for during running is a permission recorded in the permission configuration file of the APP when the APP is launched.

Based on this, after the APP is successfully installed, the mobile phone may further perform S79 and S80 in FIG. 7A and FIG. 7B. Details are as follows.

S79: When the mobile phone runs the application, if the mobile phone detects that the application applies for a first special permission, and the first special permission is included in the unavailable permission list, the mobile phone grants the first special permission to the application.

S80: The mobile phone returns preset data to the application when detecting that the application invokes an API managed and controlled by the first special permission.

The preset data may be empty data or false data. The false data may be data that is different from data managed and controlled by the first permission and that is randomly generated by the mobile phone. This can not only prevent the APP from having the exception during running, but also reduce a risk of leaking the data managed and controlled by the special permission that is set to the unavailable state, thereby improving system security.

For example, when the mobile phone runs a second APP, if the mobile phone detects that the second APP applies for the location permission, and the location permission is included in an unavailable permission list in an installation package of the second APP, the mobile phone may first grant the location permission to the second APP. The mobile phone may return a piece of empty data to the second APP when the second APP invokes the API managed and controlled by the location permission. Alternatively, the mobile phone may randomly generate, when the second APP invokes the API managed and controlled by the location permission, false data different from positioning information currently obtained by the mobile phone by using a positioning system, and return the false data to the second APP.

Figure 14D:
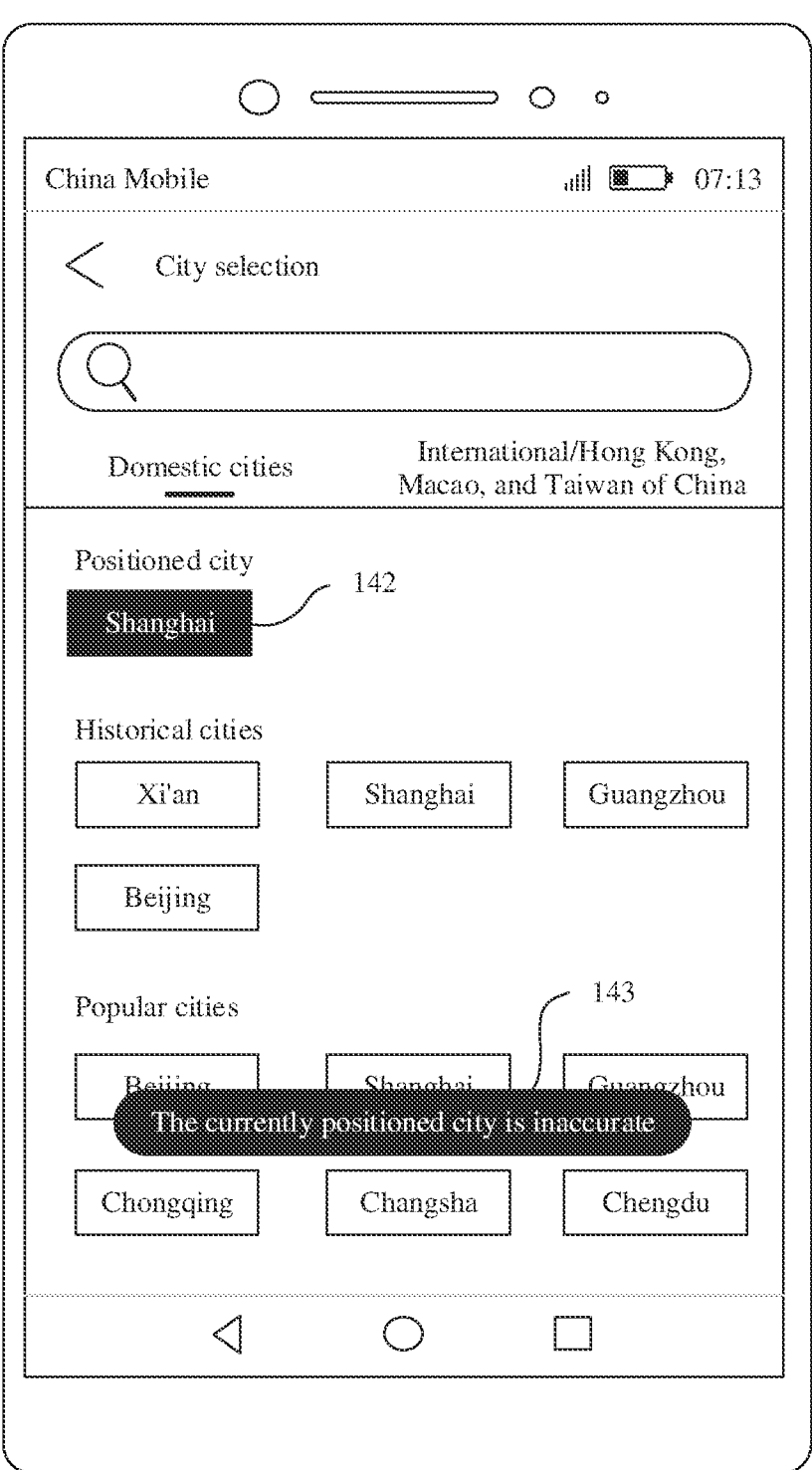
Figure 14E:
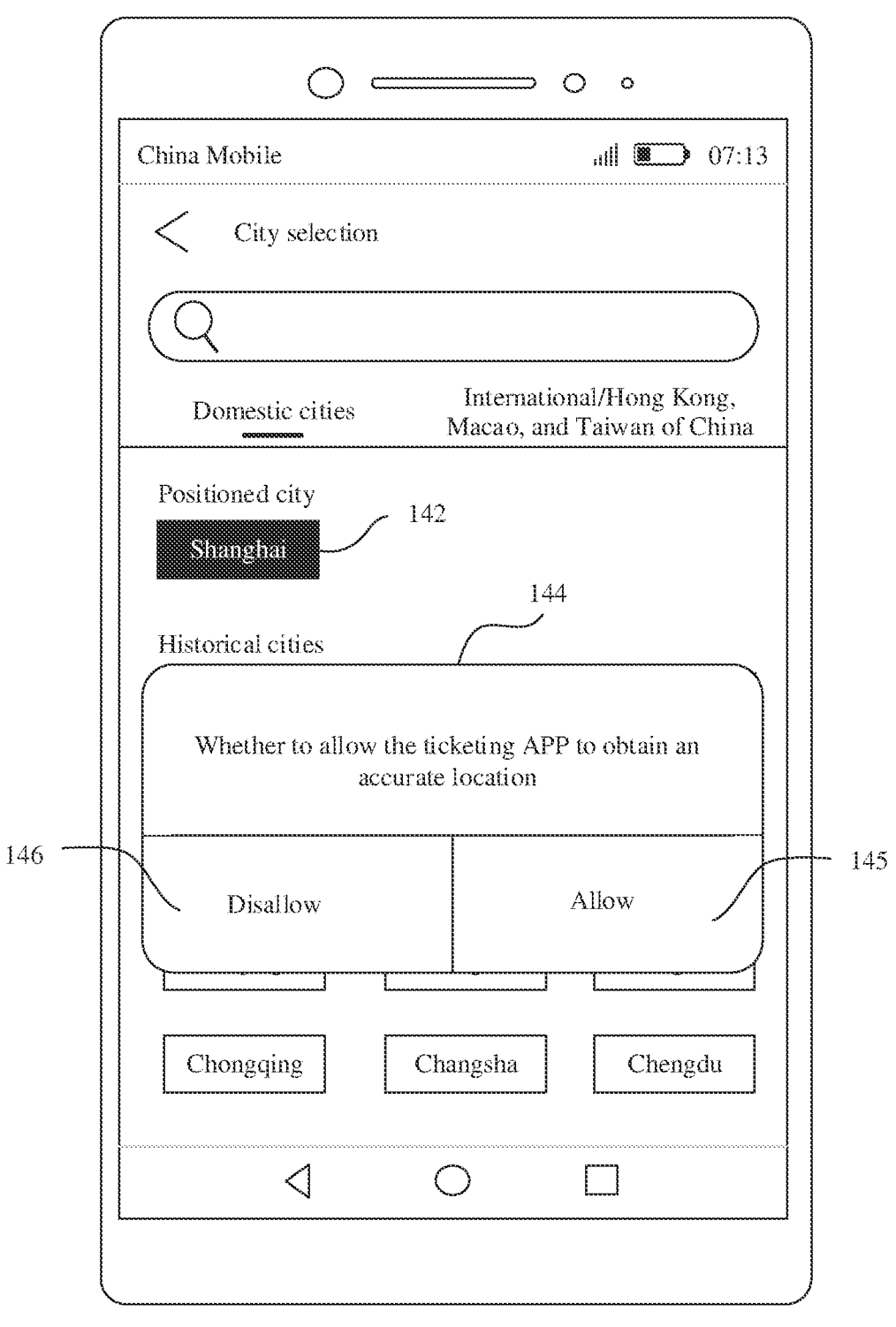

For example, when detecting that the user taps a departure place control 141 on an address selection interface of a ticketing APP shown in FIG. 14(*a*), the mobile phone may determine that the ticketing APP invokes the API managed and controlled by the location permission is detected. The mobile phone may display an interface shown in FIG. 14(*b*), to indicate to the user that positioning is currently performed. If the mobile phone determines, by using the positioning system, that a city currently positioned by the mobile phone is Beijing, the mobile phone may return location data whose positioning information is Shanghai to the ticketing APP. In addition, the mobile phone may display, in a positioning box 142 of a departure place selection interface shown in FIG. 14(*c*), that the city currently positioned by the mobile phone is Shanghai.

After the mobile phone returns the empty data or the false data to the APP, user experience of using the APP may be affected. Therefore, to improve user experience of using the APP, in still another embodiment of this application, after returning the empty data or the false data to the APP, the mobile phone may further display first prompt information on the display interface of the APP. The first prompt information is used to prompt the user that data (namely, the preset data) that is related to the first special permission and that is currently obtained by the APP is inaccurate.

For example, as shown in FIG. 14(*d*), after displaying, in the positioning box 142 of the departure place selection interface, that the city currently positioned by the mobile phone is Shanghai, the mobile phone may further display a prompt box 143 on the departure place selection interface, and display first prompt information, for example, "The currently positioned city is inaccurate", in the prompt box 143, to prompt the user that current positioning information is inaccurate.

The special permission is usually a permission related to system security of the terminal device and/or the privacy data of the user. Therefore, when the first special permission that the APP applies for is a permission related to the privacy data of the user, the user may determine whether to allow the mobile phone to return the data managed and controlled by the first special permission to the APP.

In this embodiment of this application, to enable the mobile phone to identify whether the first special permission is a permission related to the privacy data of the user, an identifier of a permission related to the privacy data of the user may be marked in a first permission list in advance. The mobile phone may identify, based on whether the identifier of the first special permission is marked in the first permission list, whether the first special permission is a permission related to the privacy data of the user. Specifically, if detecting that the identifier of the first special permission is marked in the first permission list, the mobile phone determines that the first special permission is a permission related to the privacy data of the user. If detecting that the identifier of the first special permission is not marked in the first permission list, the mobile phone determines that the first special permission is a permission not related to the privacy data of the user.

In an embodiment of this application, when the mobile phone displays the first prompt information on the display interface of the APP, or after the mobile phone displays the first prompt information on the display interface of the APP, if the mobile phone detects that the first special permission is a permission related to the privacy data of the user, the mobile phone may further display second prompt information on the display interface of the APP. The second prompt information is used to determine whether the user allows the mobile phone to return the data managed and controlled by the first special permission to the APP.

For example, as shown in FIG. 14(*e*), the mobile phone may display a prompt box 144 on the departure place selection interface, and display second prompt information, for example, "Whether to allow the ticketing APP to obtain an accurate location", in the prompt box 144. The prompt box 144 further includes a third control 145 and a fourth control 146. When detecting that the user taps the third control 145, the mobile phone determines that an operation of indicating, by the user, to allow the mobile phone to return the data managed and controlled by the first special permission to the APP is detected. When detecting that the user taps the fourth control 146, the mobile phone determines that an operation of indicating, by the user, not to allow the mobile phone to return the data managed and controlled by the first special permission to the APP is detected.

In an implementation of this embodiment, when detecting the operation of indicating, by the user, to allow the mobile phone to return the data managed and controlled by the first special permission to the APP, the mobile phone may set the first special permission to an available state, and remove the first special permission from the unavailable permission list. Then, when the APP invokes again the API managed and controlled by the first special permission, the mobile phone may return the data managed and controlled by the first special permission to the APP.

In this embodiment, when the first special permission that the APP applies for is a permission related to the privacy data of the user, the user may determine whether to allow returning the data managed and controlled by the first special permission to the APP. This can not only reduce the risk of leaking the privacy data of the user, but also improve user experience of using the APP. In addition, the mobile phone may prompt, when the APP invokes the API managed and controlled by the first special permission, the user whether to allow returning the data managed and controlled by the first special permission to the APP. This is convenient for the user to instantly manage the first special permission.

In another embodiment of this application, the user may further set, on a permission setting interface of the APP, a use status of a special permission that is related to the privacy data of the user and that is included in the unavailable permission list of the APP.

Specifically, when the mobile phone detects an operation of indicating, by the user, to open the permission setting interface of the APP, the mobile phone may display the permission setting interface of the APP. The permission that is not set to the unavailable state in the permission configuration file of the APP and the special permission that is included in the unavailable permission list of the APP may be displayed on the permission setting interface.

A use status of the permission that is not set to the unavailable state and that is displayed on the permission setting interface is an available state, and a use status of the special permission that is included in the unavailable permission list of the APP and that is displayed on the permission setting interface is an unavailable state. It should be noted that the available state is used to indicate that the permission can be applied for by the APP during running, and when the APP invokes an API managed and controlled by the permission, the mobile phone returns data managed and controlled by the permission to the APP. The unavailable state is used to indicate that the permission is not allowed to be applied for by the APP during running, or when the APP applies for the permission, the mobile phone returns empty data or false data to the APP.

In addition, a setting status of the permission that is not set to the unavailable state and that is displayed on the permission setting interface and a setting status of the special permission that is related to the privacy data of the user, that is included in the unavailable permission list of the APP, and that is displayed on the permission setting interface each are a first state. A setting status of a special permission that is not related to the privacy data of the user, that is included in the unavailable permission list of the APP, and that is displayed on the permission setting interface is a second state. The first state is used to indicate that a use status of the permission can be set by the user, and the second state is used to indicate that a use status of the permission cannot be set by the user.

For example, as shown in FIG. 15(*a*), the mobile phone may display, in an "Allowed" column on a permission setting interface, a permission that is not marked as an unavailable state in a permission configuration file of the first APP. A use status of each permission included in the "Allowed" column is an available state. The mobile phone may display, in a "Forbidden" column on the permission setting interface, all special permissions included in an unavailable permission list of the first APP. A use status of each permission included in the "Forbidden" column is an unavailable state. For example, the mobile phone may set the permission in the unavailable state to gray.

Figure 15A:
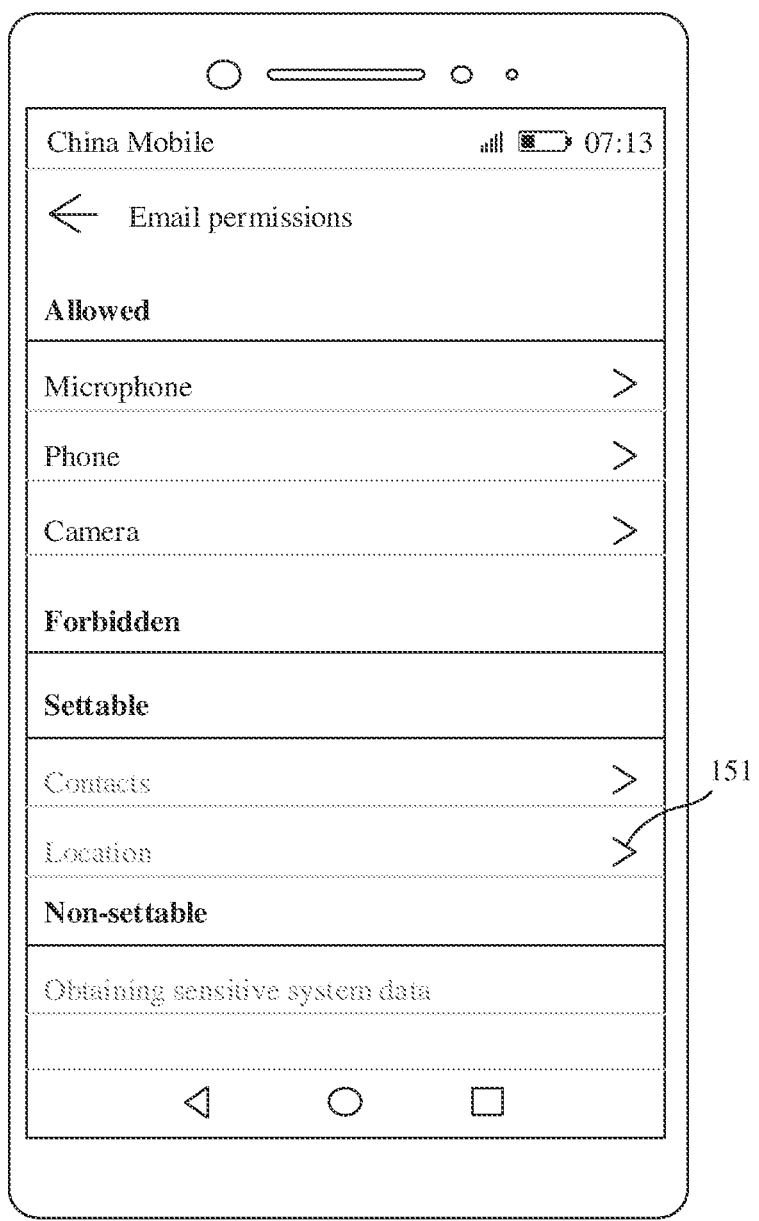
Figure 15B:
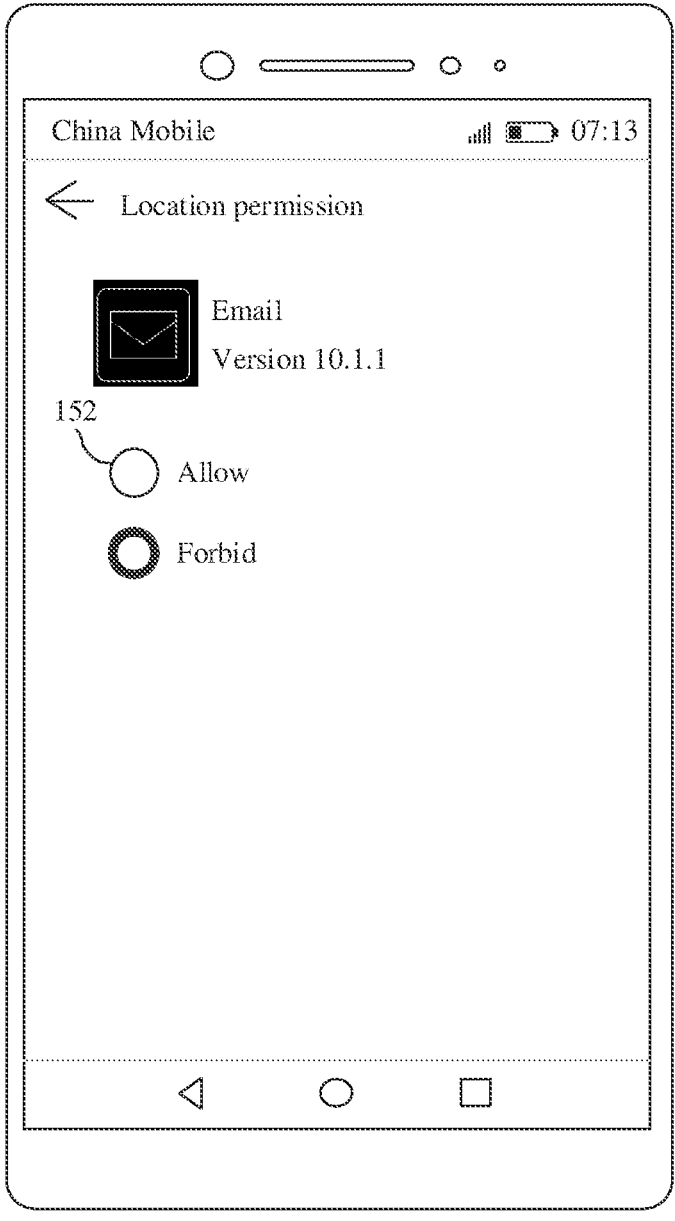

Further, the mobile phone may display, in a "Settable" column in the "Forbidden" column, a special permission that is related to the privacy data of the user and that is in the unavailable permission list of the first APP, and display, in a "Non-settable" column in the "Forbidden" column, a special permission that is not related to the privacy data of the user and that is in the unavailable permission list of the first APP. A setting status of each permission included in the "Allowed" column and the "Settable" column is the first state, and a setting status of each permission included in the "Non-settable" column is the second state. As shown in FIG. 15(a), the mobile phone may display, on the permission setting interface, a setting control 151 for each permission whose setting status is the first state. The user may set the use status of the permission by tapping the setting control 151.

Based on this, the user may set a use status of each permission included in the "Allowed" column and the "Settable" column. For example, when detecting that the user taps the setting control 151 corresponding to the location permission shown in FIG. 15(a), the mobile phone may display a display interface shown in FIG. 15(b). When detecting that the user taps an "Allow" control 152 shown in FIG. 15(b), the mobile phone determines that an operation of indicating, by the user, to set the location permission to an available state is detected, the mobile phone sets the location permission to the available state, and the mobile phone may delete the location permission from the unavailable permission list of the first APP. When the mobile phone returns to the permission setting interface of the first APP, as shown in FIG. 15(c), the mobile phone may display the location permission in the "Allowed" column. In this way, when the first APP invokes the API managed and controlled by the location permission, the mobile phone may return, to the first APP, data managed and controlled by the location permission.

In the foregoing embodiment, the user can set a use status of one or more permissions of the first APP based on a requirement of the user, to improve user experience of using the first APP.

In still another embodiment of this application, when the mobile phone installs the APP in a test phase of the APP, to enable a developer of the APP to learn a disadvantage of the APP in a timely manner, the mobile phone may stop installing the APP when determining the following several cases:

1. When the mobile phone determines that the one or more permissions that the APP needs to apply for during running include the special permission, but the installation package of the APP does not include the special permission certificate, the mobile phone stops installing the APP.

2. When the mobile phone determines that the one or more permissions that the APP needs to apply for during running include the special permission, the installation package of the APP includes the special permission certificate, but the special permission certificate is invalid, the mobile phone stops installing the APP.

3. When the mobile phone determines that the one or more permissions that the APP needs to apply for during running include the special permission, the installation package of the APP includes the special permission certificate, the special permission certificate is valid, but at least one special permission in the permission that the APP needs to apply for during running is not included in the special permission certificate, the mobile phone stops installing the APP.

When stopping installing the APP, the mobile phone may further display third prompt information that is used to prompt a cause of a failure in installing the APP, so that the developer of the APP learns the cause of the failure in installing the APP. For example, the third prompt information may be "The permission configuration file includes a special permission that is not allowed to be applied for".

In the foregoing embodiment, when the application is installed in a test environment, in the foregoing three cases, installation of the application can be stopped and/or the third prompt information can be output, to prompt the user that an applying permission that is of the application for the special permission needs to be applied to the permission service organization, so as to help the developer fix a vulnerability in the application.

It may be understood that, to implement the foregoing functions, the terminal device includes corresponding hardware and/or software modules for performing the functions. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments of this application, the terminal device may be divided into function modules based on the foregoing method examples, for example, each function module may be obtained through division based on each corresponding function, or two or more functions may be integrated into one processing module. The integrated module may be implemented in a form of hardware. It should be noted that, in this embodiment of this application, division into the modules is an example, is merely logical function division, and may be other division during actual implementation.

Figure 16:
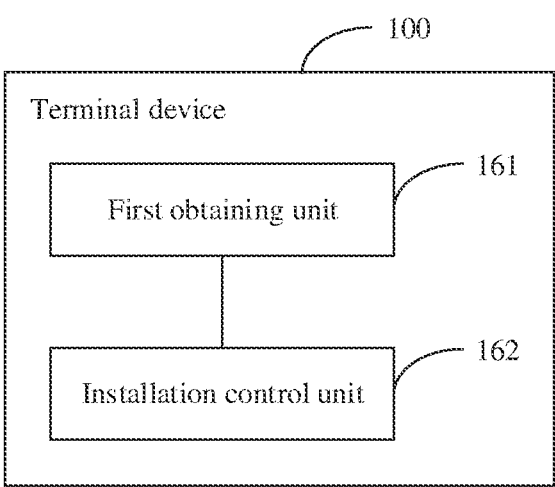
FIG. 16 is a schematic diagram of a structure of a terminal device according to an embodiment of this application.

When each function module is obtained through division based on each corresponding function, FIG. 16 is a schematic diagram of a possible structure of the terminal device 100 in the foregoing embodiment. As shown in FIG. 16, the terminal device 100 may include a first obtaining unit 161, an installation control unit 162, and the like.

The first obtaining unit 161 may be configured to support the terminal device 100 in performing S71, and/or another process of the technology described in this specification.

The installation control unit 162 may be configured to support the terminal device 100 in performing S72 to S77, and/or another process of the technology described in this specification.

In a possible implementation, the terminal device 100 may further include a list creation unit and a list modification unit.

The list creation unit and the list modification unit are configured to support the terminal device 100 in performing S78, and/or another process of the technology described in this specification.

In a possible implementation, the terminal device 100 may further include a grant control unit.

The grant control unit is configured to support the terminal device 100 in performing S79, and/or another process of the technology described in this specification.

In a possible implementation, the terminal device 100 may further include a data processing unit.

The data processing unit is configured to support the terminal device 100 in performing S80, and/or another process of the technology described in this specification.

An embodiment of this application further provides a computer storage medium. The computer storage medium stores computer instructions. When the computer instructions are run on a terminal device, the terminal device is enabled to perform the foregoing related method steps to implement the permission management method in the foregoing embodiment.

An embodiment of this application further provides a computer program product. When the computer program product runs on a computer, the computer is enabled to perform the foregoing related steps, to implement the permission management method in the foregoing embodiment.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the permission management method in the foregoing method embodiment.

The terminal device, the computer storage medium, the computer program product, or the chip provided in embodiments of this application is configured to perform a corresponding method provided above. Therefore, for beneficial effects that can be achieved, refer to the beneficial effects in the corresponding methods provided above. Details are not described herein again.

Based on the descriptions of the foregoing implementations, it may be clearly understood by a person skilled in the art that, for ease and brevity of description, division into the foregoing function modules is merely used as an example for description. During actual application, the foregoing functions may be allocated to different function modules for implementation based on a requirement, that is, an internal structure of the apparatus is divided into different function modules, to implement all or some of the functions described above.

In the several embodiments provided in this application, it should be understood that the disclosed apparatuses and methods may be implemented in other manners. For example, the described apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:

obtaining, based on detection of an application being installed, one or more permissions that the application needs to apply for during running;

setting, based on the one or more permissions comprising a special permission and based on an installation package of the application not comprising a special permission certificate, the special permission to an unavailable state that prohibits the application from applying, during running, for the special permission;

after setting the special permission to an unavailable state, and before continuing to install the application:

establishing an unavailable permission list in the installation package of the application; and recording, in the unavailable permission list, the special permission that is set to the unavailable state in the special permission comprised in the one or more permissions;

continuing to install the application, wherein the special permission certificate is associated with recording a special permission that the application is allowed to apply for during running;

after continuing to install the application:

granting, in response to the application being run, and based on it being detected that a first special permission that the application applies for is comprised in the unavailable permission list, the first special permission to the application; and returning preset data to the application, based on it being detected that the application invokes an application programming interface managed and controlled based on the first special permission, wherein the preset data comprises empty data or false data, and wherein the false data is data different from data managed and controlled based on the first special permission.

2. The method according to claim 1, wherein the method further comprises, after obtaining the one or more permissions that the application needs to apply for during running:

setting, based on the one or more permissions comprising the special permission, based on the installation package of the application comprising the special permission certificate, and based on the special permission certificate being an invalid special permission certificate, the special permission comprised in the one or more permissions to the unavailable state; and continuing to install the application.

3. The method according to claim 1, wherein the method further comprises, after obtaining the one or more permissions that the application needs to apply for during running:

setting, based on the one or more permissions comprising the special permission, based on the installation package of the application comprising the special permission certificate, based on the special permission certificate being a valid special permission certificate, and based on the special permission comprised in the one or more permissions not being comprised in the special permission certificate, the special permission that is not comprised in the special permission certificate to the unavailable state; and continuing to install the application.

4. The method according to claim 1, wherein the method further comprises, after obtaining the one or more permissions that the application needs to apply for during running:

continuing to install the application, based on the one or more permissions comprising the special permission, based on the installation package of the application comprising the special permission certificate, based on the special permission certificate being a valid special permission certificate, and based on the special permission comprised in the one or more permissions being comprised in the special permission certificate.

5. The method according to claim 1, wherein the method further comprises, after obtaining the one or more permissions that the application needs to apply for during running:

continuing to install the application based on the one or more permissions not comprising the special permission.

6. The method according to claim 1, wherein the method further comprises, after continuing to install the application:

granting, in response to the application being run, based on it being detected that a first permission that the application applies for is a permission that is not set to an unavailable state in the one or more permissions, and based on a type of the first permission being a permission that needs to be granted by a terminal device, the first permission to the application.

7. The method according to claim 6, wherein the method further comprises, after granting the first permission to the application:

returning, based on it being detected that the application invokes an application programming interface managed and controlled based on the first permission, data managed and controlled based on the first permission to the application.

8. The method according to claim 1, wherein the method further comprises, after continuing to install the application:

displaying, in response to the application being run, based on it being detected that a first permission that the application applies for is a permission that is not set to an unavailable state in the one or more permissions, and based on a type of the first permission being a permission that needs to be granted by a user, a grant request for the first permission; and granting the first permission to the application based on receiving a response to the grant request by the user indicating to allow granting the first permission to the application is detected.

9. The method according to claim 8, wherein the method further comprises, after displaying the grant request for the first permission:

skipping granting, based on receiving a response to the grant request by the user indicating not to allow granting the first permission to the application is detected, the first permission to the application.

10. The method according to claim 1, wherein the method further comprises, after returning the preset data to the application:

displaying first prompt information on a display interface of the application, wherein the first prompt information prompts a user that data, that is related to the first special permission and that is obtained by the application, is inaccurate.

11. The method according to claim 1, wherein the method further comprises, after returning the preset data to the application:

displaying, based on the first special permission being a permission related to privacy data of a user, second prompt information on a display interface of the application, wherein the second prompt information requests a response from the user indicating whether the user allows returning the data managed and controlled based on the first special permission to the application.

12. The method according to claim 11, wherein the method further comprises, after displaying the second prompt information on a display interface of the application:

setting, based on an operation of indicating, by the user, to allow returning the data managed and controlled based on the first special permission to the application being detected, the first special permission to an available state; and removing, based on setting the first special permission to an available state, the first special permission from the unavailable permission list.

13. The method according to claim 12, wherein the method further comprises, after setting the first special permission to an available state:

returning, based on it being detected that the application invokes the application programming interface managed and controlled based on the first special permission, the data managed and controlled based on the first special permission to the application.

14. The method according to claim 1, wherein the method further comprises, after continuing to install the application:

displaying a permission setting interface of the application, wherein a permission that is not set to the unavailable state in the one or more permissions and a special permission comprised in an unavailable permission list of the application are displayed on the permission setting interface, wherein a use status of the permission that is not set to the unavailable state is an available state, wherein a use status of the special permission comprised in the unavailable permission list of the application is an unavailable state, wherein a setting status of the permission that is not set to the unavailable state is a first state, wherein a setting status of a special permission that is related to privacy data of a user and that is comprised in the unavailable permission list of the application is the first state, wherein a setting status of a special permission that is not related to privacy data of the user and that is comprised in the unavailable permission list of the application is a second state, wherein the first state indicates that a use status of a permission can be set by the user, and wherein the second state indicates that a use status of a permission cannot be set by the user.

15. The method according to claim 1, wherein the method further comprises, based on the application being installed in a test environment, after obtaining the one or more permissions that the application needs to apply for during running:

stopping installing the application, based on both the one or more permissions comprising the special permission, and the installation package of the application not comprising the special permission certificate.

16. The method according to claim 1, wherein the method further comprises, based on the application being installed in a test environment, after obtaining the one or more permissions that the application needs to apply for during running:

stopping installing the application, based on the one or more permissions comprising the special permission, the installation package of the application comprising the special permission certificate, and the special permission certificate being an invalid special permission certificate.

17. A terminal device, comprising:

at least one processor; and at least one non-transitory computer-readable storage medium storing a program to be executed by the processor, the program including instructions for:

obtaining, based on detection of an application being installed, one or more permissions that the application needs to apply for during running;

setting, based on the one or more permissions comprising a special permission and based on an installation package of the application not comprising a special permission certificate, the special permission to an unavailable state that prohibits the application from applying, during running, for the special permission;

after setting the special permission to an unavailable state, and before continuing to install the application:

establishing an unavailable permission list in the installation package of the application; and recording, in the unavailable permission list, the special permission that is set to the unavailable state in the special permission comprised in the one or more permissions;

continuing to install the application, wherein the special permission certificate is associated with recording a special permission that the application is allowed to apply for during running;

after continuing to install the application:

granting, in response to the application being run, and based on it being detected that a first special permission that the application applies for is comprised in the unavailable permission list, the first special permission to the application; and returning preset data to the application, based on it being detected that the application invokes an application programming interface managed and controlled based on the first special permission, wherein the preset data comprises empty data or false data, and wherein the false data is data different from data managed and controlled based on the first special permission.

18. A non-transitory computer-readable storage medium storing a program to be executed by a processor, the program including instructions for:

obtaining, based on detection of an application being installed, one or more permissions that the application needs to apply for during running;

setting, based on the one or more permissions comprising a special permission and based on an installation package of the application not comprising a special permission certificate, the special permission to an unavailable state that prohibits the application from applying, during running, for the special permission;

after setting the special permission to an unavailable state, and before continuing to install the application:

establishing an unavailable permission list in the installation package of the application; and recording, in the unavailable permission list, the special permission that is set to the unavailable state in the special permission comprised in the one or more permissions;

continuing to install the application, wherein the special permission certificate is associated with recording a special permission that the application is allowed to apply for during running:

after continuing to install the application:

granting, in response to the application being run, and based on it being detected that a first special permission that the application applies for is comprised in the unavailable permission list, the first special permission to the application; and returning preset data to the application, based on it being detected that the application invokes an application programming interface managed and controlled based on the first special permission, wherein the preset data comprises empty data or false data, and wherein the false data is data different from data managed and controlled based on the first special permission.

* * * * *